US012657189B1

(12) United States Patent
Kandregula et al.

(10) Patent No.: US 12,657,189 B1
(45) Date of Patent: Jun. 16, 2026

(54) CROSS-REGIONAL RESOURCE LINKS IN A FEDERATED DATA LAKE MANAGEMENT AND INTEGRATION SYSTEM

(71) Applicant: Amazon Technologies, Inc., Seattle, WA (US)

(72) Inventors: Krishnaditya Kandregula, Redmond, WA (US); Purvaja Narayanaswamy, San Jose, CA (US); Sharda Kishin Khubchandani, Belmont, CA (US); Sachet Saurabh, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 18/602,663

(22) Filed: Mar. 12, 2024

(51) Int. Cl.
*G06F 16/2453* (2019.01)
*G06F 16/248* (2019.01)
*G06F 16/25* (2019.01)

(52) U.S. Cl.
CPC ...... *G06F 16/24542* (2019.01); *G06F 16/248* (2019.01); *G06F 16/256* (2019.01)

(58) Field of Classification Search
CPC . G06F 16/24542; G06F 16/256; G06F 16/248
See application file for complete search history.

(56) References Cited

U.S. PATENT DOCUMENTS 10,846,307 B1 * 11/2020 Dudami ............ G06F 16/24573
10,896,176 B1 * 1/2021 Creedon ............. G06F 16/2455

12,210,524 B1 * 1/2025 Siragusa ............. G06F 16/2393
12,271,381 B2 * 4/2025 Gladwin ........... G06F 16/24537
12,333,041 B1 * 6/2025 Rahman .............. G06F 21/6227
12,353,542 B1 * 7/2025 Bhardwaj ........... H04L 41/5019
2020/0004862 A1 * 1/2020 Bauer ................... G06F 16/254
2020/0117676 A1 * 4/2020 Ben Moshe .......... G06F 16/254

(Continued)

FOREIGN PATENT DOCUMENTS

CN 112148717 A * 12/2020 ............. G06F 16/23
WO WO-2023140940 A1 * 7/2023 .......... G06F 11/1076

OTHER PUBLICATIONS

AWS, "Accessing Tables Across Regions", Available Online at <https://docs.aws.amazon.com/lake-formation/latest/dg/data-access-across-region.html>, 2024, 5 pages.

(Continued)

*Primary Examiner* — Mark E Hershley

(74) *Attorney, Agent, or Firm* — Nicholson De Vos Webster & Elliott LLP

(57) ABSTRACT

Techniques for cross-regional resource linking in a federated data lake management and integration system. The techniques include receiving a query and identifying a referenced database object. First, metadata about this object is obtained from a local data lake metastore. If this metadata includes a cross-regional resource link, the techniques then retrieve second metadata from a remote data lake metastore. Based on this second metadata, a query execution plan is generated. This plan guides a distributed data processing system to execute data processing jobs on data stored in a distributed data storage system. Finally, the data responsive to the query is returned. The techniques efficiently integrate and manage data lake metadata resources across multiple regions.

20 Claims, 8 Drawing Sheets

(56)    References Cited

U.S. PATENT DOCUMENTS

| | | | | |
|---|---|---|---|---|
| 2020/0301941 | A1* | 9/2020 | Wilson | G06F 16/252 |
| 2020/0334241 | A1* | 10/2020 | Muralidhar | G06F 3/067 |
| 2021/0232604 | A1* | 7/2021 | Sundaram | G06F 16/24534 |
| 2021/0349901 | A1* | 11/2021 | Potharaju | G06F 16/24542 |
| 2021/0382874 | A1* | 12/2021 | Alkhatib | G06F 16/2379 |
| 2021/0406282 | A1* | 12/2021 | Yarlagadda | G06F 16/24573 |
| 2022/0019367 | A1* | 1/2022 | Freilich | G06F 3/067 |
| 2023/0222531 | A1* | 7/2023 | Cella | B25J 9/1682 |
| | | | | 705/7.31 |
| 2023/0394043 | A1* | 12/2023 | Kalmanek, Jr. | G06F 16/2457 |
| 2024/0111762 | A1* | 4/2024 | Muralidhar | G06F 16/256 |
| 2024/0232199 | A1* | 7/2024 | Hambardzumyan | |
| | | | | G06F 16/2455 |
| 2024/0256541 | A1* | 8/2024 | Gladwin | G06F 16/22 |
| 2025/0165472 | A1* | 5/2025 | Gladwin | G06F 16/2455 |
| 2025/0181585 | A1* | 6/2025 | Gladwin | G06F 16/2428 |
| 2025/0238654 | A1* | 7/2025 | Khan | G06N 3/042 |

OTHER PUBLICATIONS

AWS, "AWS Lake Formation and Glue Data Catalog Now Support Cross-Region Table Access", Available Online at <https://aws.amazon.com/about-aws/whats-new/2023/06/aws-lake-formation-glue-data-catalog-cross-region-access>, Jun. 19, 2023, 3 pages.
AWS, "Setting Up Cross-Region Table Access", Available Online at <https://docs.aws.amazon.com/lake-formation/latest/dg/setup-cross-region-access.html>, 2024, 3 pages.

\* cited by examiner

300

REGION-EU-IRELAND      USER: USER1      COMPANY-X

DATA WAREHOUSE SERVICE

CROSS-REGIONAL RESOURCE LINKS

| CROSS-REGION DATABASE ACCESS | CROSS-REGION TABLE ACCESS |

CREATE A RESOURCE LINK TO A SHARED DATABASE

RESOURCE LINK NAME                                      305

RL_USEAST1SHARED_IRELANDDB

SHARED DATABASE OWNER REGION                            310

US-EAST                                                ▼

SHARED DATABASE                                         315

USEAST1SHARED_DB

SHARED DATABASE'S OWNER ID                              320

444455556666

CANCEL          CREATE

325

400

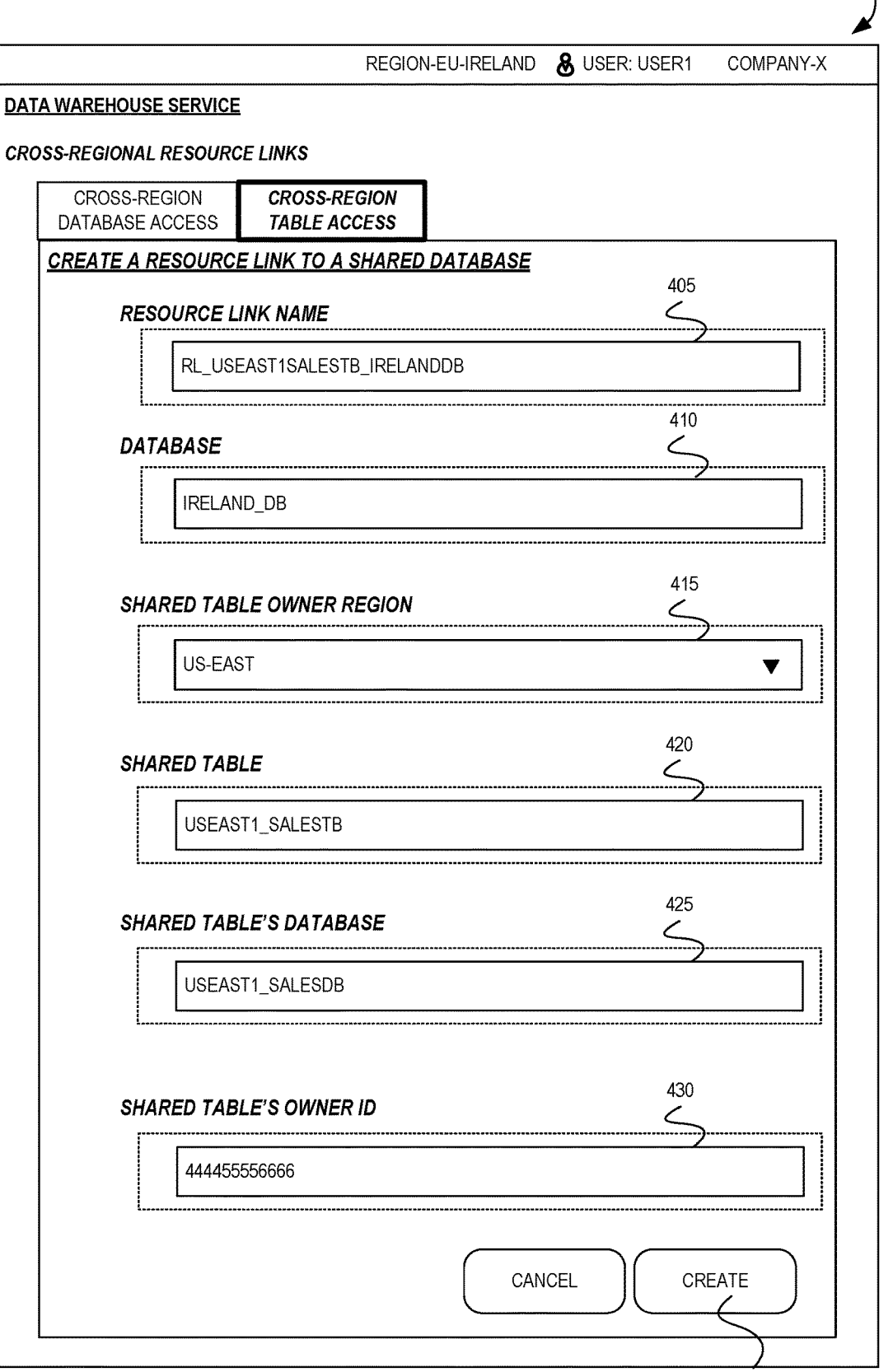

REGION-EU-IRELAND     & USER: USER1     COMPANY-X

DATA WAREHOUSE SERVICE

CROSS-REGIONAL RESOURCE LINKS

| CROSS-REGION DATABASE ACCESS | *CROSS-REGION TABLE ACCESS* |
| --- | --- |

CREATE A RESOURCE LINK TO A SHARED DATABASE

RESOURCE LINK NAME                                          405

RL_USEAST1SALESTB_IRELANDDB

DATABASE                                                    410

IRELAND_DB

SHARED TABLE OWNER REGION                                   415

US-EAST                                                        ▼

SHARED TABLE                                                420

USEAST1_SALESTB

SHARED TABLE'S DATABASE                                     425

USEAST1_SALESDB

SHARED TABLE'S OWNER ID                                     430

444455556666

CANCEL          CREATE

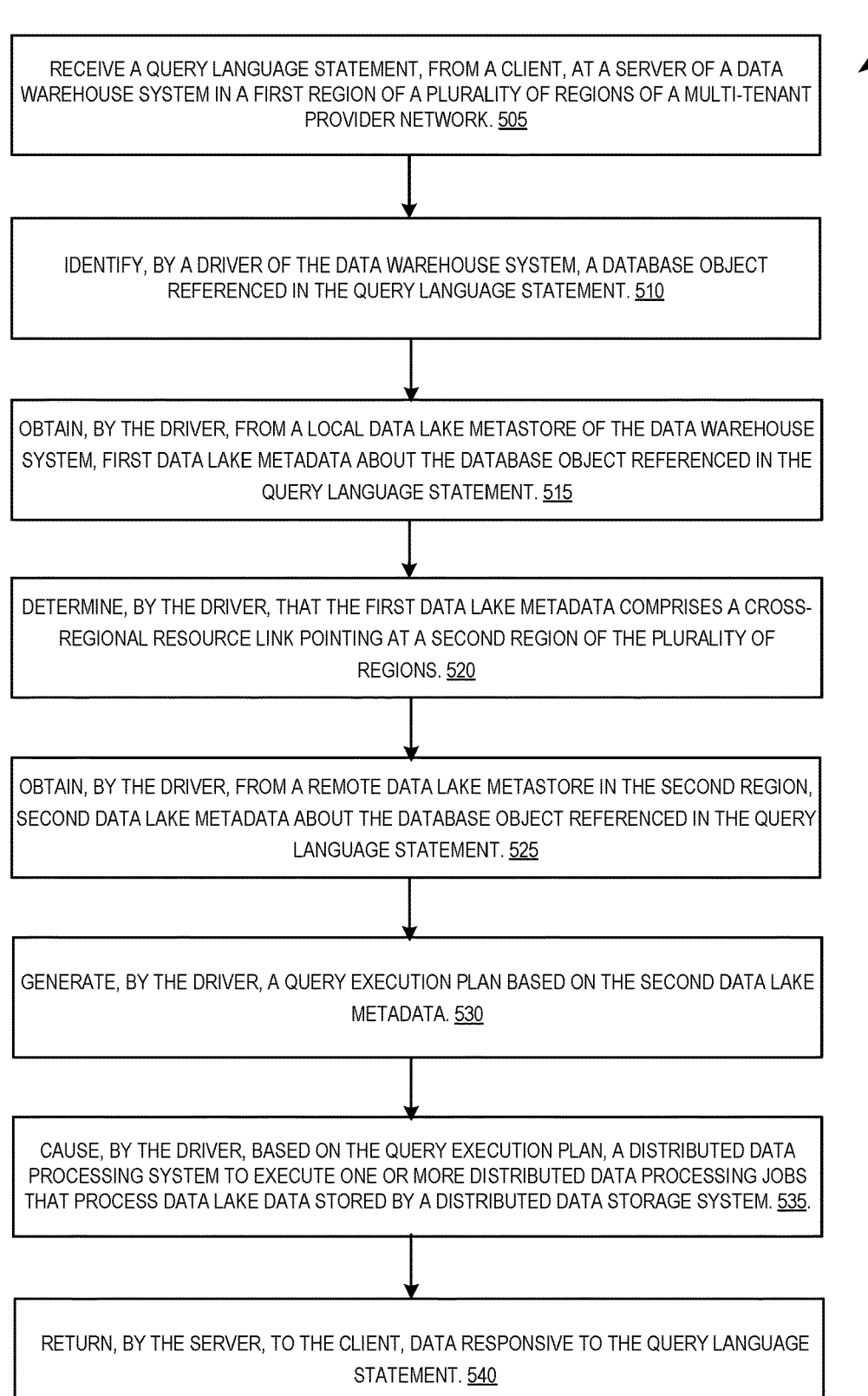

RECEIVE A QUERY LANGUAGE STATEMENT, FROM A CLIENT, AT A SERVER OF A DATA WAREHOUSE SYSTEM IN A FIRST REGION OF A PLURALITY OF REGIONS OF A MULTI-TENANT PROVIDER NETWORK. 505

IDENTIFY, BY A DRIVER OF THE DATA WAREHOUSE SYSTEM, A DATABASE OBJECT REFERENCED IN THE QUERY LANGUAGE STATEMENT. 510

OBTAIN, BY THE DRIVER, FROM A LOCAL DATA LAKE METASTORE OF THE DATA WAREHOUSE SYSTEM, FIRST DATA LAKE METADATA ABOUT THE DATABASE OBJECT REFERENCED IN THE QUERY LANGUAGE STATEMENT. 515

DETERMINE, BY THE DRIVER, THAT THE FIRST DATA LAKE METADATA COMPRISES A CROSS-REGIONAL RESOURCE LINK POINTING AT A SECOND REGION OF THE PLURALITY OF REGIONS. 520

OBTAIN, BY THE DRIVER, FROM A REMOTE DATA LAKE METASTORE IN THE SECOND REGION, SECOND DATA LAKE METADATA ABOUT THE DATABASE OBJECT REFERENCED IN THE QUERY LANGUAGE STATEMENT. 525

GENERATE, BY THE DRIVER, A QUERY EXECUTION PLAN BASED ON THE SECOND DATA LAKE METADATA. 530

CAUSE, BY THE DRIVER, BASED ON THE QUERY EXECUTION PLAN, A DISTRIBUTED DATA PROCESSING SYSTEM TO EXECUTE ONE OR MORE DISTRIBUTED DATA PROCESSING JOBS THAT PROCESS DATA LAKE DATA STORED BY A DISTRIBUTED DATA STORAGE SYSTEM. 535.

RETURN, BY THE SERVER, TO THE CLIENT, DATA RESPONSIVE TO THE QUERY LANGUAGE STATEMENT. 540

*FIG. 5*

CROSS-REGIONAL RESOURCE LINKS IN A FEDERATED DATA LAKE MANAGEMENT AND INTEGRATION SYSTEM

BACKGROUND

A data lake is a data repository that allows for the storage of large volumes of structured and unstructured data. Unlike traditional databases which require data to be structured in a predefined schema, data lakes are designed to store vast amounts of raw data with a less rigid or no predefined schema, making them flexible and scalable. This enables organizations to store data from various sources and in various formats, such as text, multimedia, sensor data, logs, and more.

One of the advantages of a data lake is its ability to support a wide range of applications, from big data analytics and machine learning to real-time reporting and visualization. Data lakes typically leverage powerful distributed computing platforms and are often integrated with various data processing and analytics tools to enable complex querying, data mining, and predictive analytics. Their scalability and agility make them suitable for individuals, businesses, organizations, and governments dealing with massive and rapidly evolving data sets, providing a foundation for data-driven decision-making.

BRIEF DESCRIPTION OF THE DRAWINGS

The detailed description of certain embodiments of the invention are understood with reference to the following figures:

FIG. 4 illustrates an example graphical user interface for creating a cross-regional link to a shared table.

FIG. 5 illustrates an example method for cross-regional resource links in a federated data lake management and integration system.

DETAILED DESCRIPTION

Figure 1:
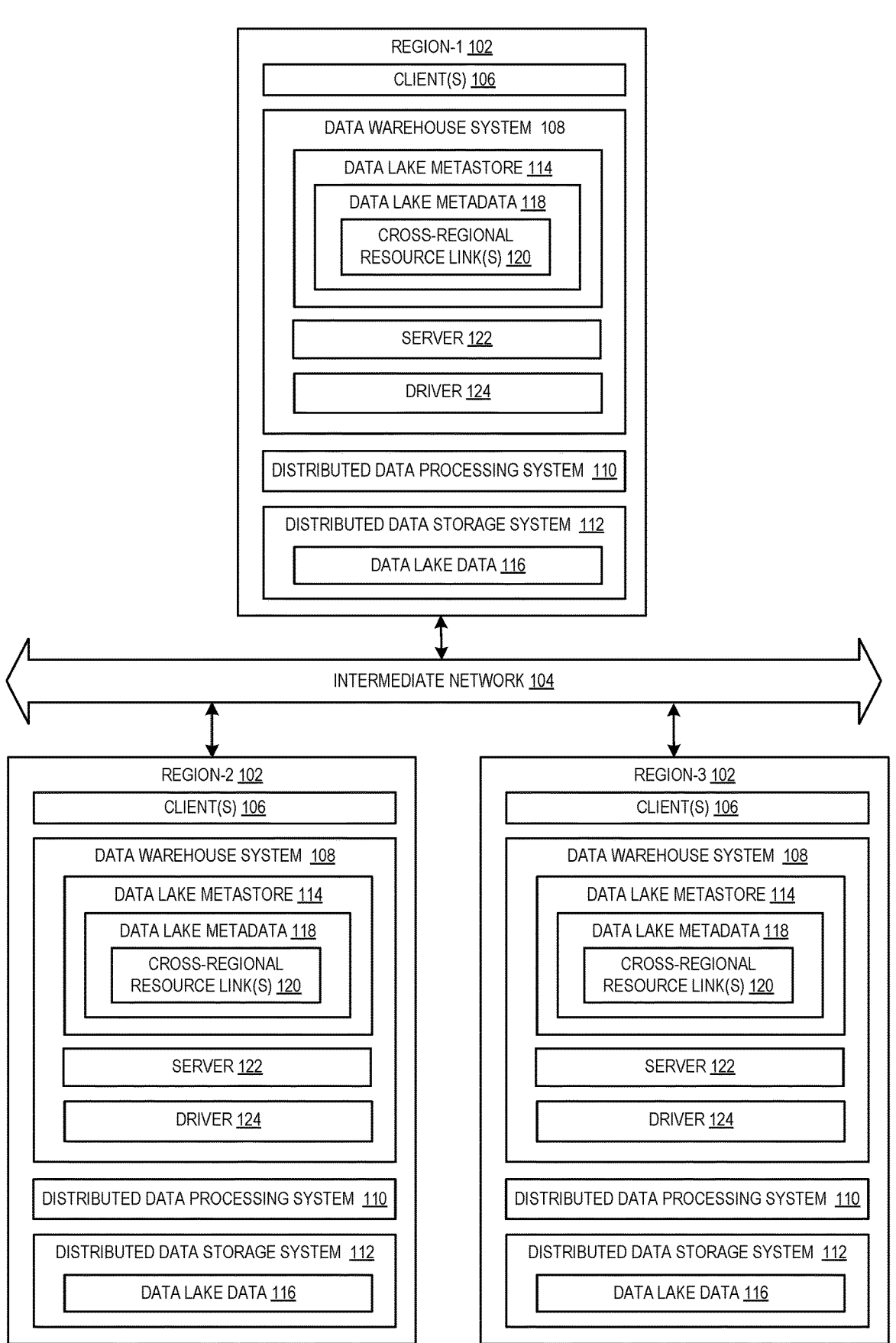
FIG. 1 illustrates an example federated data lake management and integration system implementing techniques for cross-regional resource links.

Disclosed herein are systems, methods, and non-transitory computer-readable media (generally, "techniques") for cross-regional resource links in a federated data lake management and integration system ("federated data lake system"), spread across multiple regions within a multi-tenant provider network. When a query language statement is received from a client at a data warehouse system server in one region, the federated data lake system's driver in the region identifies the referenced database or table. It then retrieves local metadata about this object. If the metadata includes a link to resources in another region, the driver accesses additional metadata from a remote data lake metastore in that second region. Utilizing this second set of metadata, the driver creates a query execution plan. This plan is used to instruct a distributed data processing system to execute data processing jobs against a data lake storage system. Finally, the data satisfying the query is returned to the client. This approach allows for efficient querying and data retrieval across different regions within the federated data lake system.

The federated data lake system is designed to manage and integrate a vast collection of data (referred to as data lake data) along with metadata about this data. Data lake data comprises a range of raw data, which can include structured, semi-structured, and unstructured data from various sources. This data is stored in its raw format, allowing for flexibility in the types of data that can be accommodated, such as text files, images, videos, system logs, sensor data, and more.

Accompanying this data repository is the data lake metadata, which is useful for managing and utilizing the data within the lake. Data lake metadata in the federated data lake context includes information about the data lake data's origin, format, content, and relationships. It provides a descriptive layer that enables users and systems to understand, categorize, and locate data lake data within the repository. The data lake metadata is useful for data lake data governance, searchability, and data lake data processing, as it allows for the organization and contextualization of the data lake's data assets. This dual structure of storing both the data lake data and its related data lake metadata enables the federated data lake system to serve as a comprehensive, scalable, and efficient data management system.

Data lake metadata is used in the processing of queries by a data warehouse system of the federated data lake system. This data lake metadata, which encapsulates detailed information about the data lake data stored in the data lake, such as data types, structures, origins, and formats, serves as a descriptor for the data warehouse system to efficiently interpret and interact with the data lake data. When a query is submitted, the data warehouse system utilizes the data lake metadata to understand the context and schema of the data lake data it needs to query. This understanding is useful for constructing accurate and efficient query execution plans. For example, if a query is targeted at a specific subset of data lake data, the data lake metadata can inform the system about the data lake data's location, partitioning details, and optimal access paths, significantly streamlining the query process. Additionally, data lake metadata can provide insights into data lake data quality, lineage, and relationships, which are useful for complex analytical queries. By leveraging data lake metadata, the data warehouse system can optimize query performance, ensuring faster response times and more precise data lake data retrieval, which is useful in environments dealing with vast and diverse datasets typical of a data lake.

Processing queries in the data warehouse system where metadata is dispersed across different user accounts and stored in various regions presents a technical challenge. In particular, there is the issue of data lake data governance and security. Accessing data lake metadata across different accounts requires robust security measures to ensure only authorized access, complying with various data lake metadata protection regulations and internal policies. This complexity is compounded when data lake metadata is spread across multiple geographical regions, each potentially having different data privacy laws and latency issues. Overall, this challenge requires a well-architected solution that balances security, efficiency, and consistency to ensure seamless query processing in a distributed, multi-user account, multi-region environment.

Consider an example where the data warehouse system in a first region receives a query in the context of a first user account that requires data lake metadata stored in a remote second region to process the query and where the remote data lake metadata belongs to a different second user account. For example, the query may reference a database table that the second user account shared with the first user account. In this example, the data warehouse system requires the remote data lake metadata about the database table in order to process the query in the first region.

One way to make the data lake metadata about the database table stored in the second region available to the data warehouse system in the first region is to replicate the data lake metadata from the second region in the first region. However, replicating data lake metadata between regions poses several technical challenges. First is the issue of network latency and bandwidth constraints. The physical distance between regions can lead to significant delays in data transfer, impacting the timeliness and efficiency of replication. This is especially problematic when dealing with large volumes of data lake metadata, as is often the case in big data scenarios. Another technical challenge is ensuring consistency and integrity of the replicated data lake metadata across regions. Synchronizing data lake metadata updates in real-time or near-real-time across geographically dispersed locations requires complex replication mechanisms that are needed to handle conflicts or discrepancies that may arise due to concurrent updates or network issues. Additionally, different regions might have varying regulatory and compliance requirements regarding data storage and transfer, which must be adhered to rigorously. Security is another critical concern; replicating data lake metadata across regions involves moving data over networks, necessitating strong encryption and secure authentication protocols to prevent unauthorized access or data breaches. Lastly, managing and monitoring the replication process, handling failures, and ensuring high availability are also complex tasks that require robust infrastructure and disaster recovery strategies.

Techniques disclosed herein provide cross-regional resource links. Cross-regional resource links effectively obviate the need to replicate data lake metadata across different regions by providing a mechanism to access and reference data lake metadata stored in one region from another. This approach leverages direct linking or referencing to the original data lake metadata source, rather than creating and maintaining duplicate copies in multiple regions.

When a query is executed by a data warehouse system in one region, and it requires data lake metadata that resides in another region, the data warehouse system can use these cross-regional resource links to access the necessary metadata in real-time. This significantly reduces the complexities and overheads associated with replicating data lake metadata, such as ensuring data consistency, managing synchronization processes, and handling the latency issues inherent in data replication across long distances. Moreover, it simplifies compliance with data governance and security policies, as the data lake metadata remains in its original location, reducing the risk of data breaches or regulatory non-compliance that can occur with multiple data copies. Utilizing cross-regional resource links also enhances data warehouse system efficiency, as it negates the need for additional storage and the computational resources required for maintaining replicated datasets. The disclosed approach ensures that data lake metadata is always up-to-date, as any changes are made directly to the original source, and these updates are immediately accessible across regions through these resource links.

Turning now to FIG. 1, it depicts an example federated data lake management and integration system 100 (also referred to as "federated data lake system 100".) In some instances, federated data lake system 100 is implemented in a multi-tenant provider network.

The multi-tenant provider network is a network architecture that is utilized in cloud computing and data center contexts to efficiently cater to multiple customers, sometimes referred to as tenants, using the same infrastructure. The multi-tenant provider network allows multiple entities (e.g., individual users, businesses, government, and organizations) to share common computing resources, such as servers and storage, while maintaining each tenant's operations isolated and secure.

In some instances, this isolation ensures that the activities or data of one tenant remain inaccessible and unaffected by others, to the extent practical and in accordance with applicable access controls. The provider network employs technologies like virtualization, virtual local area networks (VLANs), firewall systems, and identity and access control mechanisms to achieve this segregation and security. The multi-tenant model is highly scalable, permitting the addition of new tenants or expansion of resources for existing ones with relative ease.

This scalability, combined with the shared resource model, leads to significant cost efficiencies, as it eliminates the need for each tenant to invest in and maintain their own individual infrastructure. The multi-tenant provider network model is widely adopted by cloud service providers, offering various services like web hosting, software, platform, and infrastructure as services.

The multi-tenant provider network is divided into regions. A "region" refers to a specific geographical area where the provider network's resources and services are located and made available to tenants. Essentially, a region is a cluster of one or more data centers, operated by the provider, that are physically situated in a particular part of the world. A data center is a physical facility used to house computer systems and associated components, such as telecommunications and storage systems, which is designed for collecting, storing, processing, distributing, or allowing access to large amounts of data.

The regions are strategically established to provide localized services to tenants, ensuring reduced latency, compliance with regional data regulations, and improved reliability. Each region typically comprises multiple redundant and interconnected data centers, offering high availability and disaster recovery capabilities. However, a region can encompass just a single data center or a single point of presence (POP).

The geographical distribution of the provider network allows tenants to choose the region closest to their user base or where they have specific compliance needs, thus optimizing the performance and legal aspects of their hosted services. In a multi-tenant environment, while tenants share the overall infrastructure of the provider, within each region, their data and applications are by default kept isolated to a degree from those of other tenants, maintaining security and privacy. By offering multiple regions, the provider network can cater to a global customer base, offering flexibility and customization based on different geographic needs and requirements.

In the example of FIG. 1, there are three regions 102 designated as Region-1, Region-2, and Region-3. However, the number of regions may vary from multi-tenant provider network to multi-tenant provider network depending on the size of the provider network. The techniques disclosed herein can operate in a multi-tenant provider network that has as few as two regions and as many as tens or hundreds of regions.

As shown in FIG. 1, the different regions 102 are interconnected via an intermediate network 104, which acts as a bridge facilitating communication and data transfer between these geographically dispersed regions. In some instances, this intermediate network 104 is a high-speed, high-capacity network infrastructure, designed to handle large volumes of data and ensure fast, reliable connectivity. It allows for data exchange and operational interactions among different regions 102 of the provider's network. The architecture of this intermediate network 104 incorporates routing, load balancing, and network optimization technologies to manage the data flow efficiently. The network 104 includes strong encryption protocols and secure data transmission channels to safeguard against unauthorized access and data breaches. Additionally, the network 104 is designed for high availability and redundancy, ensuring continuous service even in the case of individual component failures or regional outages.

The federated data lake system 100 encompasses a data warehouse system 108, a distributed data processing system 110, and a distributed data storage system 112 in each region 102 that are united within the multi-tenant provider network to form a single cohesive entity, while still maintaining a degree of independence and control. Each data warehouse system 108, distributed data processing system 110, and distributed data storage system 112 in each region 102 of system 100 maintains a level of control and independence, especially regarding governance of and access to data lake metadata 118 and data lake data 116.

The federated data lake system 100 including the data warehouse system 108, the distributed data processing system 110, and the distributed data storage system 112 is implemented in each region 102 by one or more programmable electronic devices (e.g., device 800 of FIG. 8) configured with software or other programmable logic programmed to perform functions and operations described herein for cross-regional resource links in a data lake management and integration system.

Data lake data 116 refers a collection of data stored in distributed data storage system 112, a centralized repository designed to store large amounts of raw data in its native format. Unlike traditional databases that require data to be structured and schema-defined before storage, data lakes are designed for flexibility, allowing them to store a wide variety of data types. This includes structured data, such as rows and columns from relational databases or CSV files; semi-structured data, like JSON or XML files, which might not fit neatly into traditional table structures but still contain some organizational properties; and unstructured data, which encompasses a broad range of formats like text documents, emails, social media posts, digital images, audio files, and video files. Additionally, data lakes can store more complex data types, such as log files, sensor data from IoT devices, and binary data. This eclectic mix of data types is what makes data lakes valuable for big data analytics, machine learning, and other advanced data processing tasks. They provide a comprehensive repository where all forms of data can be stored at scale and made accessible for various analytical purposes, ranging from historical data analysis to real-time data processing.

The distributed data storage system 112 in each region 102 stores its own segment of data lake data 116, allowing for localized management and access. The data lake data 116 in each region 102 is stored in distributed file systems or databases designed to handle vast amounts of structured, semi-structured, and unstructured data. For example, distributed data storage system 112 can encompass any or all of: a distributed file system that allows access to files containing data lake data 116 on a server as if there were located on a client computer; an object storage system that stores data lake data 116 as objects where each object includes the data itself, potentially some metadata about the data, and a globally unique identifier; a distributed database storing data lake data 116 that runs on multiple computers; a block storage system that stores data lake data 116 in fixed-sized blocks, each identified by a unique address; a network attached storage system that involves the attachment of storage devices directly to a network allowing multiple computers to access shared pools of data lake data 116; a content delivery network (CDN) used as distributed storage to cache data lake data 116; or any other type of distributed data storage system suitable for storing data lake data 116.

In some instances, to ensure data availability and disaster recovery, some or all of data lake data 116 is replicated between regions 102. This replication involves copying data from one region 102 to another region 102, either continuously or at scheduled intervals. The replication process is managed to maintain data consistency and integrity across regions 102. The process involves mechanisms to handle network latency, bandwidth limitations, and potential data transfer costs. Furthermore, data replication adheres to regional compliance and data sovereignty laws, which can vary significantly from one region 102 to another region 102.

Distributed data storage system 112 applies access controls to ensure that only authorized principals can access specific data sets. In some instances, such access control is accomplished and managed through any or all of: identity and access management (IAM) policies, role-based access control (RBAC), and attribute-based access control (ABAC).

When a principal (e.g., a user, a service, a role, or an application) attempts to access data lake data 116 within the data lake, the distributed data storage system 112 first authenticates the principal's identity, using credentials like usernames and passwords, tokens, digital certificates, or other suitable authentication mechanism. After authentication, the distributed data storage system 112 determines the principal's permissions using predefined access policies. These policies are configured by administrators and define what actions (like read, write, delete) a principal can perform on which data sets. In role-based access control, principals are assigned to roles, and each role has specific permissions. For example, a data analyst might have read-only access to certain data sets, while a data engineer might have broader access that includes the ability to modify or delete data. Attribute-based access control takes this a step further by considering additional attributes (like the time of access, the location of the user, or the classification of the data) in making access decisions. In distributed data storage system 112, these controls are enforced across regions 102, ensuring consistent policy application regardless of which region 102 the particular data lake data 116 being accessed is stored.

A distributed data processing system 110 operates on the data lake data 116 stored in the distributed data storage system 112. The distributed data processing system 110 is designed to efficiently handle large-scale data analysis across multiple computing resources. In such a system, the data lake acts as a vast repository, storing diverse data types ranging from structured to unstructured data. The distributed data processing system 110 leverages the power of parallel processing to analyze the data lake data 116.

For example, in some instances, the distributed data processing system 110 encompasses a MapReduce system. In the MapReduce programming model, a distributed data processing job is divided into smaller sub-tasks (Map phase), and these tasks are then distributed across a cluster of computers of the distributed data processing system 110. Each node in the cluster processes a chunk of the data lake data 116 independently. This is effective in the data lake environment where the data volume is massive and varied. The intermediate results from each node are then aggregated and reduced (Reduce phase) to form the final output.

While the distributed data processing system 110 can encompass a MapReduce system, the distributed data processing system 110 encompasses another type of distributed data processing system in other instances. For example, the distributed data processing system 110 can encompass any or all of: a distributed in-memory computing framework designed to efficiently process large volumes of data lake data 116 in-memory by distributing computations across multiple nodes in a cluster, offering scalability, fault tolerance, and high-speed processing capabilities; a cloud-based data warehouse providing a highly scalable and flexible environment for storing, managing, and analyzing vast amounts of data lake data 116, leveraging the power of cloud computing to handle complex queries and large datasets efficiently; a cloud-based big data processing service offering a scalable and managed platform for analyzing and processing vast amounts of data lake data 116, leveraging the cloud's resources to handle large-scale data workloads efficiently; a unified analytics platform that integrates various data processing and analytics tools into a single, cohesive framework, enabling efficient processing, analysis, and machine learning on data lake data 116 with streamlined collaboration and management; a distributed SQL query engine engineered to perform fast, interactive analysis on large datasets across multiple sources in the data lake, using familiar SQL syntax to query data lake data 116 regardless of its location or format; or any other suitable type of distributed data processing system.

Operating logically on top of the distributed data processing system 110 is the data warehouse system 108. The data warehouse system 108 serves as a high-level interface for client(s) 106 for managing and querying data lake data 116 stored in distributed data storage system 112. The data warehouse system 108 provides a mechanism to project structure in the form of databases and database tables onto the data lake data 116 and query the data lake data 116 using a high-level query language such as the Structured Query Language (SQL) or like query language. The data warehouse system 108 translates these high-level queries into distributed data processing jobs that are executed by the distributed data processing system 110 against the data lake data 116 stored by the distributed data storage system 112.

This abstraction provided by the data warehouse system 108 allows client(s) 106 that are configured to use a high-level query language to interact with vast amounts of data lake data 116 stored in the distributed data storage system 112, without needing to be configured to interface, manage, orchestrate, or control the underlying distributed data processing jobs executed by the distributed data processing system 110. Some types of distributed data processing jobs that are executed by the distributed data processing system 110 might include, for example, any or all of: MapReduce jobs, "Tez" jobs, or "Spark" jobs.

A MapReduce job is a specific task executed within the MapReduce framework for processing large datasets across a cluster of computers. The job encompasses two main phases: the Map phase and the Reduce phase. In the Map phase, the job takes a large input dataset and divides it into smaller, manageable chunks. These chunks are then processed in parallel by different mapper tasks. Each mapper task performs a specific operation, such as filtering or sorting, on its chunk of data, producing intermediate key-value pairs as output. This phase is designed to perform operations that can be done independently across different parts of the data.

Following the Map phase is the Shuffle and Sort phase, which may go by different names in different implementations. In this phase, the MapReduce system sorts the outputs of the map tasks by key and shuffles them to ensure that all values for a single key are sent to the same reducer.

Then comes the Reduce phase. Here, the reducer tasks take the sorted key-value pairs and merge the values with the same key. The reduce phase typically involves summarizing, combining, or reducing the data in some way to produce the final output. For example, it might aggregate the data to calculate sums, averages, or other statistical measures.

MapReduce is simple and scalable. Since the map tasks are independent, they can be distributed across many machines in a cluster, allowing the job to process huge datasets much more quickly than if the data were processed on a single machine. This makes MapReduce particularly suitable for data-intensive tasks such as large-scale text processing, data mining, and log file analysis.

A "Tez" job is a type of distributed data processing task that might be executed by the distributed data processing system 110. Unlike MapReduce, which follows a sequence of Map and Reduce tasks, a Tez job allows for the creation of more complex and efficient distributed data processing workflows through directed acyclic graphics (DAGs).

In a Tez job, the data processing logic is broken down into a series of interconnected tasks, represented as vertices in a DAG. Each vertex in the DAG represents a different processing step, which could be akin to a map or reduce function but is not limited to these. The edges between these vertices define the data flow and dependencies between the tasks. This setup enables a Tez job to optimize the workflow, for instance, by reducing the need for writing intermediate results to disk, which is a common bottleneck in MapReduce.

Tez jobs are effective for interactive query processing and iterative algorithms, where multiple stages of computation are common. By allowing different stages of processing to occur in a more streamlined and interconnected manner, Tez significantly reduces the time and resources required for complex data processing tasks. In some instances, the data warehouse system 108 causes the distributed data processing system 110 to execute Tez jobs that execute complex queries and transformations on large data sets more efficiently than traditional MapReduce jobs.

A "Spark" job represents the entire process of executing a series of transformations and actions on data lake data 116 by the distributed data processing system 110. When a Spark job is run, it converts the data operations into a logical plan known as a Directed Acyclic Graph (DAG). Each Spark job is then divided into stages, based on data shuffling requirements, where stages are further broken down into tasks, the smallest units of work sent to executors (worker processes) of the distributed data processing system 110.

What sets a Spark job apart from a MapReduce job is their in-memory computation capability. Unlike traditional MapReduce, where intermediate data is written to disk, a Spark job can keep this data in memory, significantly speeding up the processing. This makes a Spark job highly efficient for iterative algorithms, common in machine learning and interactive data analysis.

Each Spark job begins with a set of data lake data 116 from the distributed data storage system 112, upon which transformations are applied. Transformations, like map, filter, or join, create new datasets from the input data lake data 116 but are lazy, meaning they are not executed until an action (like count, collect, or save) is called. This laziness allows a Spark job to optimize the overall data lake data 116 processing pipeline.

The execution of a Spark job involves distributing tasks across nodes of the distributed data processing system 110, handling faults and retries efficiently, and optimizing for data locality to reduce network traffic and improve speed. The final result of a Spark job can be a new data set written to a storage system, a set of aggregated statistics, or any other output defined by the actions in the job.

In data warehouse system 108, when a query received from a client 106 is executed, it undergoes a complex process that involves the generation of a query execution plan and the subsequent execution of one or more distributed data processing jobs by the distributed data processing system 110. Initially, a client 106 issues a query using a high-level language, such as SQL, to the data warehouse system 108. The data warehouse system 108, which logically sits on top of the distributed data processing system 110, first parses this query to understand its structure and intentions. Then, the data warehouse system 108 optimizes the query by creating a query execution plan. This plan is essentially a specification of how the query will be executed across the distributed data processing system 110 as one or more distributed data processing jobs executed by the distributed data processing system 110. The query execution plan includes, for example, decisions on how to access the data lake data 116 such as, for example, how to join tables, and in what order to execute operations.

This query execution plan is then translated by the data warehouse system 108 into one or more distributed data processing jobs that are executed by the distributed data processing system 110. In some instances, each job is designed to efficiently process a segment of the data lake data 116 in parallel, leveraging the distributed nature of the underlying system.

The distributed data processing system 110 manages the execution of these jobs across multiple nodes in a cluster, ensuring that the data lake data 116 is processed quickly and efficiently. It handles the distribution of data and computation, the scheduling of tasks, and the aggregation of results. Once all the jobs are completed, the final result of the query is compiled by the data warehouse system 108 and returned to the client 106.

Clients 106 send database query language statements to the data warehouse system 108 for processing. A database query language statement is a command or instruction written in a language designed to interact with databases, enabling users to perform various operations such as retrieving, updating, or deleting data. For example, a database query language statement in a SQL-like database query language is: "SELECT name, age FROM users WHERE age >30 ORDER BY age DESC;". This example statement retrieves the name and age columns from the users table, but only for those rows where the age is greater than 30. The ORDER BY clause then dictates that these results should be sorted in descending order based on the age.

An example of a database query language statement in a data lake context is: "SELECT product_category, SUM (sales_amount) AS total_sales FROM sales_data WHERE transaction_date BETWEEN '2023 Jan. 1' AND '2023 Jan. 31' GROUP BY product_category ORDER BY total sales DESC;". In this example, the database query language statement asks to analyze sales data stored in the data lake by product category for the specified data range.

A database query language statement submitted by a client may reference different databases and different tables. In the following example, the referencing of different databases is accomplished by prefixing table names with their respective database names. For example, suppose there are two databases: 'sales_db' and 'inventory_db.' The 'sales_db' database contains a table name 'sales_data' with sales transaction details, and the 'inventory_db' database has a table named 'product_info' with information about products. The following database query language statement combines data from two different databases to provide a report of total sales amounts by product: "SELECT s.product_id, i.product_name, SUM (s.sales_amount) AS total_sales FROM sales_db.sales_data s JOIN inventory_db.product_info i ON s.product_id=i.product_id GROUP BY s.product_id, i.product_name;".

When the data warehouse system 108 in a region 102 receives a database query language statement intended to query the data lake data 116, it relies on data lake metadata 118 from the data lake metastore 114 in the region 102 to process the query effectively. The data lake metastore 114 contains detailed data lake metadata 118 about the structure and properties of the data lake data 116, such as table schemas, column data types, file formats, data partitioning information, and file locations.

Upon receiving a query, the data warehouse system 108 parses the statement to understand its structure and intent. It then consults the data lake metastore 114 in the region 102 to retrieve the relevant data lake metadata 118 for the tables and columns referenced in the query. This relevant data lake metadata 118 is used by the data warehouse system 108 to validate the query syntax against the actual data structure, map the query to the physical data lake data 116, and optimize the query execution plan. For instance, if the query involves filtering based on certain columns or joining multiple tables, the data warehouse system 108 uses the relevant data lake metadata 118 to determine how to access the data lake data 116 most efficiently, whether it's spread across different files or partitions. The relevant data lake metadata 118 also aids in data type validation and conversion, ensuring that the operations specified in the query are compatible with the actual data types of the columns. The data lake metadata 118 from the data lake metastore 114 is used by the data warehouse system 108 to interpret, validate, and execute the query accurately on the data lake data 116, transforming the high-level query (e.g., SQL-like query) into specific data retrieval and processing actions.

A database table is one type of database object that can be referenced in a query language statement received by the data warehouse system 108. A variety of database objects can be referenced in a query, and for the data warehouse system 108 to effectively process these queries, it requires specific data lake metadata 118 from the data lake metastore 114. The primary types of database objects include tables, which are the central structures for storing data in rows and columns, akin to tables in a relational database. For tables, the data warehouse system 108 needs metadata like table schema (e.g., column names and data types), file format (e.g., text, Parquet, ORC), and location (e.g., path or identifier for use with distributed data storage system 112) for these tables.

In an embodiment, metadata about a database object received by the data warehouse system 108 can include table version information for supporting time travel-style queries. Time travel queries allow users to query data as it existed at a specific point in time, offering the ability to view historical data states or revert changes. When the data warehouse system 108 obtains metadata from the local or remote data lake metastore, this metadata can encompass various versions of the database table, each associated with different timestamps. This versioning information enables the data warehouse system 108 to identify and access the specific state of the data requested by the client's query, regardless of the current state of the data. By leveraging this versioned metadata, the driver 124 can generate a query execution plan that specifically targets the version of the data relevant to the requested point in time. This facilitates not only the accurate retrieval of historical data but also enhances data management practices by allowing for audits, data recovery, and analysis of data evolution over time.

Views are another type of database object that can be referenced in a query language statement received from a client 106 by the data warehouse system 108. A view is a virtual table created by a query joining one or more tables. Data lake metadata 118 for views includes, for example, the SQL query that defines the view and its resultant schema. For example, assume there is a view named "customer_view" which has been created to provide a simplified and aggregated view of customer data. The "customer_view" might contain aggregated data such as total sales and number of orders per customer. In this case, the following query language statement queries this view to find all customers who have made more than 10 orders: "SELECT customer_name, total_orders FROM customer view WHERE total_orders >10;".

Partitions are another type of database object that can be referenced in a query language statement. Partitions are subsets of table data, often used for dividing large tables into more manageable segments based on column values. The data warehouse system 108 requires partition data lake metadata 118, including partition keys and their corresponding values, to efficiently process queries involving partitioned tables. For example, assume there is a table named "sales_data" that is partitioned based on the year and month of the sales. The partitioning could be defined on year and month columns when the table is created. In this example, the following statement queries the sales data for the month of March in the year 2023: "SELECT product_id, total_sales FROM sales_data WHERE year='2023' AND month='03';".

User-defined functions (UDFs) and user-defined aggregate functions (UDAFs) are yet other types of database objects that can be referenced in a query language statement. The data warehouse system 108 needs data lake metadata

118 about their implementation and interface. This data lake metadata 118 includes function names, input and output data types, and the location of the function code. For example, assume there is a UDF named "calculate bonus" which calculates the bonus for sales representatives based on their sales amount. The following example statement uses this UDF: "SELECT employee_id, sales_amount, calculate_bonus (sales_amount) AS bonus FROM sales_data;". As another example, assume there is a UDAF named "total_sales_in_usd," which converts sales amounts in various currencies to UDF and then sums them up. The following example query language statement uses this UDAF: "SELECT region, total_sales_in_usd (sales_amount, currency) AS total_sales FROM international sales_data GROUP BY region;".

In federated data lake system 100 distributed across multiple regions 102, the data lake metadata 118 is associated with different user accounts spanning these regions 102. In such a system 100, each user account, potentially representing different departments, projects, or even separate business, organizations, or governments, maintains its own subset of data lake metadata 118 in the data lake metastore 114. This data lake metadata 118, which describes the structure, format, and characteristics of the data lake data 116 (like table schemas, column data types, and storage information), is used by the data warehouse system 108 for data querying and management.

As the federated data lake system 100 is geographically distributed, the data lake metadata 118 might also be region-specific, reflecting the data lake data 116 residency and compliance requirements of each region 102. This setup allows for localized management of data lake data 116, enabling faster access and region-specific data governance while still under the umbrella of a federated architecture. The federated nature ensures that despite the geographical distribution and account-based segregation, there is a level of interoperability and potential for cross-region and cross-account data access, subject to appropriate security and access controls. This structure is useful in large, multi-tenant environments where data isolation is useful, yet there is also a need for flexibility to collaborate and share data lake metadata 118 and data lake data 116 across different regions 102 and user accounts.

In federated data lake system 100 that spans across multiple regions 102, the data lake metadata 118 structure is tailored not only to accommodate the specificities of each region 102 but also to the distinct requirements of different user accounts. This dual specificity—both regional and user account-based—is useful for handling the complexities of a diverse, multi-tenant environment. Region-specific data lake metadata 118 allows the system 100 to address various local requirements, such as data residency regulations, regional performance optimizations, and localized data management practices and potentially to avoid replicating data lake metadata 118 between regions 102. Each region 102 can have its own data lake metadata 118 settings, reflecting the data lake data 116 stored in that particular geographical area. This regional approach ensures compliance with local laws and regulations and optimizes data access based on geographical proximity.

Simultaneously, within each region 102, data lake metadata 118 can be further segregated based on user accounts. This account-specific data lake metadata 118 approach is useful in multi-tenant environments where different users or teams might have separate data lake data 116 sets with unique access controls, security settings, and management needs. Each user account's data lake metadata 118 includes details about their own data lake data 116 objects—like tables and views—including structure, format, and access policies. This setup allows individual users or teams to manage their data lake metadata 118 and data lake data 116 independently while adhering to broader organizational policies and regional compliance requirements.

By combining region-specific and user account-specific data lake metadata 118, the federated data lake system 100 provides a flexible yet controlled framework. It supports efficient data management and querying while maintaining necessary compliance and security standards. Such an arrangement is particularly advantageous in large organizations with a global footprint, where data management needs to be both globally coherent and locally relevant.

In federated data lake management system 100, data lake data 116 and its associated data lake metadata 118 can be managed differently, particularly regarding replication across regions 102. While the actual data lake data 116 might be replicated between regions 102 for various reasons, such as ensuring high availability, reducing data access latency, or adhering to regional data governance policies, the data lake metadata 118 describing this data is not necessarily replicated in the same way.

The data replication process involves copying the actual data lake data 116 from one region 102 to another region 102, ensuring that the same data lake data 116 is accessible in multiple geographical locations. This is useful for scenarios like disaster recovery, where data lake data 116 availability is a key concern, or for performance optimization, where data lake data 116 needs to be closer to the region 102 where it is most frequently accessed.

On the other hand, the data lake metadata 118—which includes information about the data lake data 116's structure, format, and storage location—might not be replicated across regions 102. Instead, it may be centrally managed and accessed as needed. This approach is partly due to the nature of data lake metadata 118, which is typically much smaller in size than the actual data lake data 116 and doesn't require the same level of redundancy. Moreover, centralizing data lake metadata 118 management, especially on a per-user account or per-region basis, simplifies the maintenance of data lake metadata 118 consistency and integrity, as there is a single, authoritative source for data lake metadata 118 information. It also reduces the complexity and overhead associated with synchronizing data lake metadata 118 updates across multiple regions.

This separation in replication strategies for data lake data 116 and data lake metadata 118 allows the federated data lake system 100 to balance between efficient data lake data 116 distribution and streamlined data lake metadata 118 management, optimizing both data accessibility and system administration.

In federated data lake system 100, the distribution of data lake data 116 and data lake metadata 118 across multiple regions 102 can lead to scenarios where a query received by the data warehouse system 108 in one region 102 references a database object whose relevant data lake metadata 118 is stored in the data lake metastore 114 in another region 102. This situation arises due to the federated nature of the system 100, where data lake data 116 and data lake metadata 118 are distributed for reasons such as locality, compliance, or load balancing. When a client 106 submits a query to the data warehouse system 108, the query might specify a database object like a table or a view, which is logically part of the data warehouse system 108 but physically located in a different region 102.

The data warehouse system 108, upon receiving the query, first attempts to resolve and validate the query against the data lake metadata 118 for the database object in the data lake metastore 114 local to the region 102 at which the query is received. This local data lake metadata 118 may contain some or all of the relevant data lake metadata 118 for the database object. If not all, the local data lake metadata 118 may contain a cross-regional resource link 120 to the relevant data lake metadata 118 stored in a remote data lake metastore 114 in a remote region 102. If relevant data lake metadata 118 for the referenced database object is stored in a different region, then the data warehouse system 108 in the local region 102 fetches this data lake metadata 118 across regional boundaries. This involves accessing the remote data lake metadata store 114, which might involve dealing with network latency and ensuring secure cross-regional communication. The data lake metadata 118 includes useful information such as the structure of the database object, data types, and the physical location of the underlying data lake data 116, which are used for query planning and execution by the local data warehouse system 108.

Once the necessary data lake metadata 118 is retrieved, the local data warehouse system 108 can proceed to generate an execution plan for the query. This plan may involve orchestrating distributed data processing jobs that span multiple regions 102, depending on where the actual data lake data 116 resides and the computational resources available. The ability to reference data lake data 116 and data lake metadata 118 across regions 102 in the federated data lake system 100 underlines its flexibility and scalability, enabling comprehensive data analysis and decision-making processes that leverage diverse and geographically dispersed data assets.

As an example, consider the previous example query statement: "SELECT s.product_id, i.product_name, SUM (s.sales_amount) AS total_sales FROM sales_db.sales_ data s JOIN inventory_db.product_info i ON s.product_id=i.product_id GROUP BY s.product_id, i.product_name;" This query statement may be received at the data warehouse system 108 in region-1 102 from a client 106 in region-1 102. The query statement references two tables: "sales_db" and "inventory_db."

Consider the case where the data lake metadata 118 for the "sales_db" table is stored locally in the data lake metastore 114 in region-1 102 and the data lake metadata 118 for the "inventory_db" table is stored remotely in the data lake metastore 114 in region-2 102. In this case, for the data warehouse system 108 in region-1 102 to process the query, it needs the data lake metadata 118 for both the "sales_db" table and the "inventory_db" table.

Instead of replicating some or all the data lake metadata 118 for the "inventory_db" table in the data lake metastore 114 in region-2 102 in/to the data lake metastore 114 in region-1 102, the data lake metadata 118 for the "inventory_db" table in the data lake metastore 114 in region-1 102 contains a cross-regional resource link 120 to the region-2 102. The data warehouse system 108 in the local region-1 102 fetches/retrieves the data lake metadata 118 for the "sales_db" table and the "inventory_db" table from the local data lake metastore 114 in the local region-1 102. In this example, the actual data lake metadata 118 describing the "sales_db" table is available in the local data lake metastore 114 in the local region-1 102. However, some or all of the actual data lake metadata 118 describing the "inventory_db" table is not available in the local data lake metastore 114 in the local region-1 102. Instead, the local data lake metadata 118 for the "inventory_db" table in the local data lake metastore 114 contains a cross-regional resource link 120 pointing at/to the region-2 102 where the some or all of the actual data lake metadata 118 describing the "inventory_db" table is stored. The data warehouse system 108 in the local region-1 102 dereferences/follows the cross-regional resource link 120 to fetch/retrieve actual data lake metadata 118 for the "inventory_db" table from the data lake metastore 114 in the remote region-2 102.

In federated data lake system 100, a cross-regional resource link 120 is a specialized form of data lake metadata 118 stored in the data lake metastore 114 of one region 102, which the data warehouse system 108 can use to access or retrieve data lake metadata 118 for a database object located in a data lake metastore 114 of a remote region 102. This cross-regional resource link 120 acts as a reference or pointer to the data lake metadata 118 stored in another region 102.

In some instances, a cross-regional resource link 120 contains information necessary for establishing a connection to the remote data lake metastore 114, such as the network address (like a uniform resource locator (URL) or uniform resource indicator (URI)), credentials or access tokens for authentication, and any necessary routing information.

When a client 106 issues a query that involves a database object in a different region 102, the data warehouse system 108 in the local region first consults its local data lake metastore 114. Upon encountering the cross-regional resource link 120, it uses the details in the cross-regional resource link 120 to establish a secure connection to the remote data lake metastore 114. Once connected, it retrieves the required data lake metadata 118, such as table schema, data format, or file location. This data lake metadata 118 is then used by the local data warehouse system 108 to understand how to access the actual data lake data 116 and how to execute the query properly. By utilizing these cross-regional resource links 120, the data warehouse system 108 can efficiently query and manage data lake metadata 118 distributed across the multi-region federated data lake system 100, ensuring seamless access to data lake data 116 and data lake metadata 118 irrespective of their physical location.

In the federated data lake system 100 set up across multiple regions 102, a query submitted to the data warehouse system 108 in one region 102 does not need to specify the region 102 where the data lake metadata 118 for a particular database object referenced in the query is stored. This is because the data warehouse system 108 is designed to handle the resolution of data locations and data lake metadata references in a way that opaque to the client.

When a client 106 submits a query, it references database objects like tables or views without specifying their regional data lake metadata 118 locations. The data warehouse system 100 in the local region 102, upon receiving the query, first consults its local data lake metastore 114 to determine how to process the query.

If the required data lake metadata 118 is not locally available but is instead stored in a remote region 102, the local data warehouse system 108 will identify a cross-regional resource link 120 within its local data lake metastore 114. This cross-regional resource link 120 acts as a bridge to the data lake metadata 118 stored in the data lake metastore 114 of the remote region 102. The local data warehouse system 108 uses this cross-regional resource link 120 to seamlessly access the remote data lake metadata 118, handling all the complexities of cross-regional communication, such as network connections, authentication, and data lake metadata 118 retrieval.

To the client, this process is entirely hidden; except for perhaps some query processing latency delay, it is unaware of the underlying operations that retrieve metadata from another region. The data warehouse system 100 abstracts these details, presenting a unified interface to the client 106. As a result, users can query and interact with the federated data lake system 100 as if it were a single, cohesive entity, without needing to understand or manage the distribution of data lake data 116 and data lake metadata 118 across different regions 102. This design simplifies the client experience, while the system efficiently manages the complexities of a distributed, multi-region architecture.

In federated data lake system 100, a data lake metastore 114 within a specific region 102 can contain cross-regional resource links 120, which are essentially references that point to data lake metadata 118 resources located in different regions 102. These cross-regional resource links 120 enable the data warehouse system 108 to access and integrate information across the federated data lake system 100, facilitating a federated data management approach. Each cross-regional resource link 120 in the data lake metastore 114 acts as a connector or pointer to a data lake metadata 118 resource in a remote region 102, such as data lake metadata 118 for a particular database object (like a table or a view).

These cross-regional resource links 120 include information to locate and access the data lake metadata 118 in the other regions 102, such as network addresses, paths, or identifiers unique to the remote data lake metastores 108. They can also contain authentication and authorization details required for secure access.

The cross-regional resource links 120 allows for a unified view and access to data lake metadata 118 that is physically distributed across multiple regions 102, without the need to replicate data lake metadata 118 in every region 102. This setup is advantageous for efficiency, data sovereignty, compliance with regional regulations, and optimization of data access based on geographic or organizational needs. It provides users with the flexibility to access and analyze data across regions as if it were a single, integrated system, while maintaining data locality and adhering to regional constraints. This architecture is particularly beneficial in large, global organizations where data is distributed but needs to be accessible in a cohesive and coordinated manner.

In the federated data lake system 100 utilizing cross-regional resource links 120, the scenario where the remote data lake metadata 118, referenced by such a cross-regional resource link 120, belongs to a different account than the one submitting the query is possible. This situation can arise in the multi-tenant federated data lake system 100, where different users, departments, businesses, organizations, or governments (accounts) have their own data lake data 116 and data lake metadata 118. When an account submits a query that involves accessing data lake metadata 118 outside its immediate purview, it utilizes a cross-regional resource link 120 that points to data lake metadata 118 managed by another account in a different region 102.

This cross-account access is facilitated by the federated architecture of the system 100, which allows for controlled sharing and linkage of data lake metadata 118 across different accounts. The data lake metadata 118 in the remote region 102, although owned by a different account, is made accessible through predefined permissions and security protocols. These protocols ensure that only authorized users or accounts can access or query the data lake metadata 118, maintaining data security and integrity.

In federated data lake system 100, sharing data lake metadata 118 between different accounts, for the purpose of creating cross-regional resource links 120, enables collaborative data lake metadata 118 access while maintaining data governance and security. Suppose Account A owns certain data lake metadata 118 in region-1 102, and Account B needs to access this data lake metadata 118 for its data warehouse system 108 queries in region-2 102. Account A can share its data lake metadata 118 with Account B, through controlled and secure sharing mechanisms provided by the federated data lake system 100.

This sharing is governed by stringent access control policies and permissions, ensuring that Account B can only access the specific data lake metadata 118 that Account A intends to share with Account B, and nothing beyond that. Once the data lake metadata 118 is shared, Account B can create a cross-regional resource link 120 in the data lake metastore 114 in region-2 102 pointing to this shared data lake metadata 118 stored in the data lake metastore 114 in region-1 102. This cross-regional resource link 120 acts as a reference or pointer, enabling Account B to access or query the data lake data 116 described by the data lake metadata 118 stored in region-1 102 as if the shared data lake metadata 118 were part of the data lake metastore 114 in region-2 102, but without duplicating the actual shared data lake metadata in region-2 102.

This method of data lake metadata 118 sharing and linking is useful in scenarios where collaborative analysis or processing of data lake data 116 across different users, business units, departments, organizations, businesses, or governments is required. It allows for efficient use of data lake metadata 118 resources, avoids redundancy, and ensures that data governance policies are upheld. By leveraging shared data lake metadata 118 and cross-regional resource links 120, different accounts within the same or different organizations can work together on data lake data 116, while still maintaining the autonomy and security of their respective data lake metadata 118 assets. This approach is particularly useful in large, complex organizations where different teams or departments need to collaborate on shared data projects, but also need to enforce strict access controls and data privacy.

The data lake metastore 114 is a central repository in each region 102 within the federated data lake system 100 that stores and manages data lake metadata 118 about the data lake data 116 stored in the distributed data storage system 112 This data lake metadata 118 includes information about the structure of tables, views, columns, data types, partitioning information, and storage locations, among other details. Essentially, the data lake metastore 114 serves as the definitive source of truth about the data lake data 116 in the federated data lake system 100, enabling efficient data management and query processing.

Access control in the data lake metastore 114 ensures that only authorized principals can access or modify the data lake metadata 118 and, by extension, the underlying data lake data 116. The data warehouse system 108 enforces this access control through integration with security and authorization modules. This may be done through integration with external identity and access management systems. These systems provide a framework for defining and enforcing security policies, which can include some or all of: role-based access control (RBAC), attribute-based access control (ABAC), and other fine-grained access control mechanisms.

When the data warehouse system 108 attempts to access data lake metadata 118 on behalf of a principal (e.g., an account that submits a query to the data warehouse system 108), the data warehouse system 108 checks these security policies to determine if the principal has the necessary permissions. This includes when the data warehouse system 108 resolves a cross-regional resource link 120 and attempts to access data lake metadata 118 in a remote region 102. This check involves validating the principal's identity and their roles or attributes against the access control policies defined for the data lake metadata 118 objects they are trying to access. If the principal has the required permissions, the operation is allowed; otherwise, it is denied. This process ensures that sensitive data is protected and that compliance requirements are met.

The server 122 of the data warehouse system 108 provides an interface for clients 106 to execute queries against data lake data 116 including submitting those queries to the data warehouse system 108 and receiving results thereto. It is designed to act as a listener for incoming client 106 requests and has the capability to handle multiple client 106 connections concurrently. This makes it useful for environments where numerous clients 104 need to interact with the data warehouse system 108 simultaneously.

The server 122 facilitates the execution of queries by supporting various communication protocols. For example, the server 122 may support JDBC (Java Database Connectivity) and ODBC (Open Database Connectivity). These protocols are standards for interacting with databases, allowing a range of client 106 applications—from data analytics tools to business intelligence software—to connect to the server 122 and perform data querying operations. Through JDBC and ODBC, clients 106 can submit SQL-like queries to the server 122, which are then processed by the driver 124 of the data warehouse system 108, leveraging the distributed data processing systems 110's capability to manage and query the data lake data 166 stored in the distributed data storage system 112.

In addition to JDBC (Java Database Connectivity) and ODBC (Open Database Connectivity) protocols, the sever 122 may support several other types of interfaces to cater to diverse client 106 needs and integration scenarios. One such interface is the "Thrift" interface or the like, which is based on or like APACHE THRIFT, a software framework for scalable cross-language services development. The Thrift interface allows clients written in languages other than Java, like Python or C++, to interact with the server 122, making the data warehouse system 108 accessible to a broader range of applications and development environments. Another interface could be a RESTful API (Representational State Transfer Application Programming Interface), which enables web-based interactions with the server 122. RESTful APIs are used for building web services that are lightweight, maintainable, and scalable, allowing easy integration with web applications and services.

Furthermore, the server 122 can also support command-line interfaces (CLIs) for direct user interaction via command-line commands, catering to users of clients 106 who prefer a more hands-on, script-based approach to interacting with the data warehouse system 108.

While the server 122 might not itself directly provide a graphical user interface (GUI) for clients 106 to submit queries, in some instances, it serves as a backend service that can be connected to various front-end GUI tools (e.g., a Jupyter Notebook or a SQL Workbench). These GUI tools are designed to provide a more user-friendly and intuitive way for clients to interact with the data warehouse system 108. Users of clients 106 can use these graphical interfaces to write, manage, and execute queries without needing to deal with command-line interfaces or write complex scripts. These GUI tools may connect to the server 122 using JDBC or ODBC drivers, enabling communication with the driver

124. Once connected, users can leverage the GUI's features like query editors with syntax highlighting, query history, and data visualization tools to work with data lake data 116 via queries submitted to the server 112.

Clients 106 encompass various applications, services, and users that interact with the data warehouse system 108 to perform data processing and analysis tasks. These clients 106 can range from data analysts and scientists who use the data warehouse system 108 for querying and analyzing large datasets, to business intelligence tools and data visualization software that connect to the data warehouse system 108 for reporting and insights generation.

Clients 106 interact with the data warehouse system 108 through a database query language, such as SQL or a SQL-like query language, which allows them to execute queries, create and modify tables, and perform other data manipulation tasks. Clients 106 can connect to the data warehouse system 108 using different interfaces such as JDBC (Java Database Connectivity) and ODBC (Open Database Connectivity) drivers, which enable integration with a variety of programming languages and tools. Additionally, the data warehouse system 106 can be accessed through command-line interfaces, web interfaces, and integrated development environments (IDEs) that support such connectivity.

Clients 106 can also encompass applications that programmatically interact with the data warehouse system 108, such as ETL (Extract, Transform, Load) tools, custom applications developed in languages like Python or Java, and other data processing frameworks that can execute queries or retrieve data from the data warehouse system 108.

The driver 124 manages the lifecycle of a query language statement during its execution. It parses the query, compiles it into a plan, and executes that plan using the distributed data processing system 110 to produce the requested results. The driver 124 encompasses a compiler, an optimizer, and an executor. The compiler component of the driver 124 converts the query into an execution plan, which includes the specification of one or more distributed data processing jobs (e.g., one or more MapReduce, Taz, or Spark jobs) to be executed by the distributed data processing system 100. The optimizer performs various optimizations on the execution plan to improve the efficiency of the query. This may include reordering transformations, merging tasks, etc. The executor executes the job(s) defined in the execution plan. It interfaces with the distributed data processing system 100 to perform the distributed data processing job(s).

One of the operations performed by the driver 124 when processing query is data lake metadata 118 collection, where the driver 124 interacts with the data lake metastore 114. The data lake metastore 114 contains data lake metadata 118 about the data lake data 116, including information about tables, columns, data types, file formats, and data locations. The driver 124 queries the data lake metastore 114 to retrieve this data lake metadata 118, which is essential for understanding the structure and schema of the database objects (e.g., tables, views, columns, and rows) referenced in the query. This data lake metadata 1 18 helps the driver 124 in several ways: it validates the existence and structure of the tables and columns and other database objects mentioned in the query, aids in the interpretation of the query's semantics, and assists in the optimization and generation of an efficient execution plan. Without this data lake metadata 118, the driver 124 would not be able to correctly parse, validate, or execute the query.

In the federated data lake system 100 that spans multiple regions, the data lake metadata 118 collected from the data lake metastore 114 for query processing can include cross-regional resource links 120. These cross-regional regional links 120 are essentially references to data lake metadata 118 resources that are located in a different region 102 from where the query is being executed. When a query is submitted, the driver 124, which is responsible for query execution, interacts with the data lake metastore 114 in the local region 102 to gather the necessary data lake metadata 118. If the data lake metadata 118 indicates that the required or additional data lake metadata 118 is stored in a remote region 102, this information is presented in the form of cross-regional resource links 120.

The driver 124 then takes on the task of resolving these cross-regional resource links 120. This involves the driver 124 accessing the remote data lake metastore 114 or data resource as referenced by the cross-regional resource link 120. The driver 124 handles the complexities of establishing connections across regional boundaries, which may include network communication, authentication, and compliance with data access policies. Once the driver 124 successfully resolves these cross-regional resource links 120 and retrieves the required or additional data lake metadata 118 from the remote location, it proceeds with the execution of the query using this information.

Figure 2:
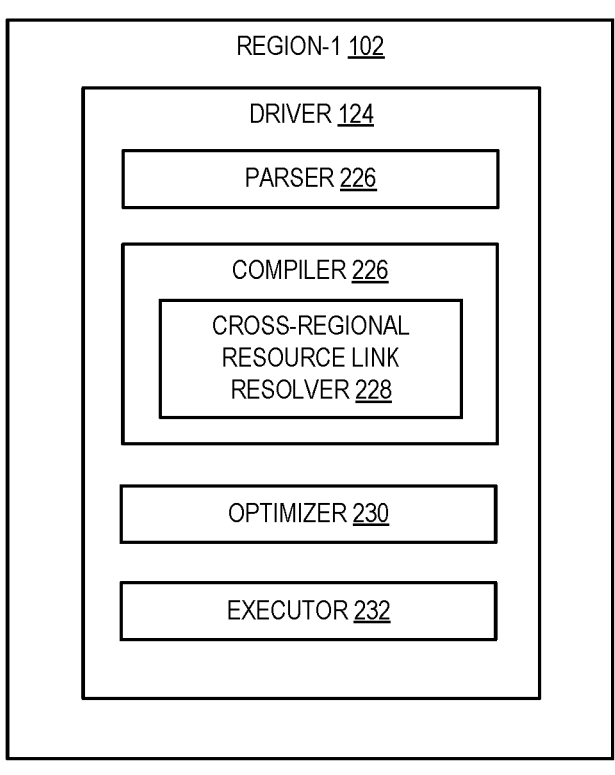
FIG. 2 illustrates an example driver of a data lake warehouse system with a cross-regional resource link resolver.

FIG. 2 illustrates the components of an example driver 124 in a region 102. The driver 124, integral to processing queries in the data warehouse system 108, encompasses several components that collaboratively handle the execution of a query. The process begins with the parser 226, which interprets the query, breaking it down into a structured format, typically an Abstract Syntax Tree (AST). This step is useful for understanding the syntactic structure of the query. Following this, the compiler 226 comes into play. The compiler 226 transforms the AST into a logical plan, detailing the sequence of operations required to execute the query. It's at this stage where the compiler 226 interacts with the data lake metastore 114, the repository containing data lake metadata 118 about various tables, databases, and other database objects.

When a query involves accessing data that spans across multiple regions 1102, the cross-regional resource link resolver 228 of the compiler 226 is responsible for resolving cross-regional resource links 120. These cross-regional resource links 120, stored as part of the dat lake metadata 118 in the data lake metastore 114, point to data lake metadata 118 stored in different geographic locations. The cross-regional resource link resolver 228 of the compiler 226 uses these cross-regional resource links 120 to determine the location and structure of the data lake metadata 118 required for the query, effectively orchestrating how and from where the data lake metadata 118 should be retrieved. This might involve fetching data lake metadata 118 from remote data lake metastores 114 or directing the query execution plan to access data lake metadata 118 stored in remote regions.

Once the cross-regional resource link resolver 228 of the compiler 226 has successfully resolved these cross-regional resource links 120 and incorporated the necessary information into the query plan, the optimizer 230 further refines this plan for efficiency. Finally, the executor 232 executes the query, using the plan created and optimized by the previous components. Throughout this process, the ability of the cross-regional resource link resolver 228 of the compiler 226 to resolve cross-regional resource links 120 is useful for enabling seamless access to distributed data, ensuring the data warehouse system 108 can efficiently process queries in a federated and geographically dispersed data environment.

Figure 3:
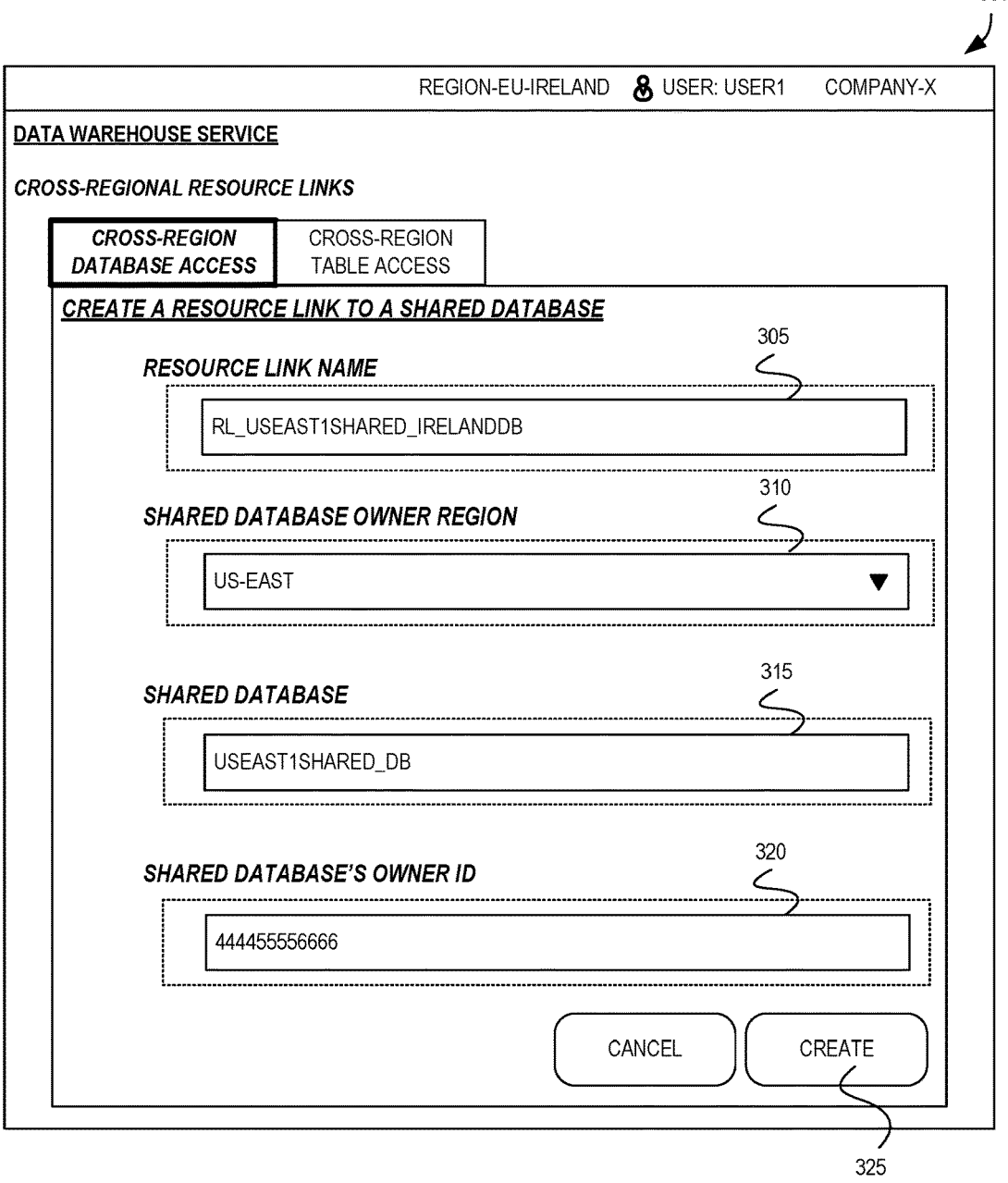
FIG. 3 illustrates an example graphical user interface for creating a cross-regional link to a shared database.

FIG. 3 illustrates an example graphical user interface 300 for creating a cross-regional resource link to a shared database. For the purposes of this example, a user of a multi-tenant provider network customer account "user1" is using GUI 300 in a region-1 102, located in Ireland. The user, using credentials associated with the customer network account, has successfully authenticated with the data warehouse system 108 in region-1 102. In this example, the customer account is associated with customer "Company-X."

A different customer has shared a database named "USE-ASTISHARED_DB" stored in the data lake metastore 114 in a different region-2 102, located in the Eastern United States. The database is shared with customer account "user1". GUI 300 may be used by the user in the "EU-IRELAND" region to create a cross-regional resource link 120 in the data lake metastore 114 in "EU-IRELAND" region-1 102 that points to the shared database stored in the data lake metastore 114 in "US-EAST" region-2 102. The shared database is a collection of one or more database objects (e.g., tables and views) which are also shared by virtue of sharing the database that contains them.

Once the cross-regional resource link 120 is created (and assuming the database remains shared), for queries submitted to the data warehouse system 108 in the "EU-IRE-LAND" region 102 that reference the shared database by name "USEAST1SHARED_DB," the data warehouse system 108 in the "EU-IRELAND" region 102 will fetch any needed data lake metadata 118 pertaining to database objects (e.g., views, columns, tables, etc.) in the shared database from the data lake metastore 114 in the "US-EAST" region 102. Note that an express reference to the cross-regional resource link 120 is not required in the queries. Instead, simply by referring to the shared database name in the queries, the data warehouse system 108 in the "EU-IRE-LAND" region 102 can determine based on the cross-regional resource link 102 created in the data lake metastore 114 in the "EU-IRELAND region 102 that the needed data lake metadata 118 needs to be fetched/retrieved from the data lake metastore 114 in the "US-EAST" region. Thus, the cross-regional resource link 120 allows queries referencing the shared database to be executed in a way that is transparent to the client 106 as if all needed data lake metadata 118 is available in the local data lake metastore 114 without having to replicate needed data lake metadata 118 between regions 102.

The GUI 300 provides graphical user interface controls including text input boxes, select boxes, and buttons. Controls 305 are for inputting an internal name of the cross-regional resource link to be created. As mentioned, queries do not need to reference the cross-regional resource link name explicitly. Controls 310 are for selecting the region of the multi-tenant provider network where the shared database is located, which, in this example, is the "US-EAST" region. Controls 315 are for inputting the name of the shared database. Controls 320 are for inputting the account identifier of the owner of the shared database which, in some instances, is auto populated based on the input to controls 315. Selecting the "create" button 325 will initiate the process of creating the cross-regional resource link. There is also a "cancel" button to disregard or back out of creating the cross-regional resource link 120.

FIG. 4 illustrates an example graphical user interface4 for creating a cross-regional resource link to a shared table. For the purposes of this example, a user of a multi-tenant provider network customer account "user1" is using GUI 400 in a region-1 102, located in Ireland. The user, using credentials associated with the customer network account, has successfully authenticated with the data warehouse system 108 in region-1 102. In this example, the customer account is associated with customer "Company-X."

A different customer has shared a table named "USEAST1_SALESDB" stored in the data lake metastore 114 in a different region-2 102, located in the Eastern United States. The database is shared with customer account "user1". GUI400 may be used by the user in the "EU-IRELAND" region to create a cross-regional resource link 120 in the data lake metastore 114 in "EU-IRELAND" region-1 102 that points to the shared database table stored in the data lake metastore 114 in "US-EAST" region-2 102. While in this example, the shared database resource is a database table, the shared database resource could be another type of database resource such as, for example, a column or set of columns, a row or a set of rows, or a view.

Once the cross-regional resource link 120 is created (and assuming the database table remains shared), for queries submitted to the data warehouse system 108 in the "EU-IRELAND" region 102 that reference the shared database table by name "USEAST1_SALESTB," the data warehouse system 108 in the "EU-IRELAND" region 102 will fetch any needed data lake metadata 118 pertaining to the shared database table from the data lake metastore 114 in the "US-EAST" region 102. Note that an express reference to the cross-regional resource link 120 is not required in the queries. Instead, simply by referring to the shared database table name in the queries, the data warehouse system 108 in the "EU-IRELAND" region 102 can determine based on the cross-regional resource link 120 created in the data lake metastore 114 in the "EU-IRELAND region 102 that the needed data lake metadata 118 needs to be fetched/retrieved from the data lake metastore 114 in the "US-EAST" region. Thus, the cross-regional resource link 120 allows queries referencing the shared database table to be executed in a way that is transparent to the client 106 as if all needed data lake metadata 118 is available in the local data lake metastore 114 without having to replicate needed data lake metadata 118 between regions 102.

The GUI 400 provides graphical user interface controls including text input boxes, select boxes, and buttons. Here, the local region 102 is "EU-IRELAND" and the remote region 102 is "US-EAST." Controls 405 are for inputting an internal name of the cross-regional resource link 120 to be created in the local region 102 "EU-IRELAND". As mentioned, queries submitted to the data warehouse system 108 in the local region 102 do not need to reference the cross-regional resource link 120 name explicitly. Controls 410 are for inputting the name of the database in the local region 102 "EU-IRELAND" that will contain the cross-regional resource link 120. Controls 415 are for selecting the remote region 102 of the multi-tenant provider network that contains the shared table which, in this example, is "US-EAST." Controls 420 are for inputting the name of the shared database table in the remote region 102. Controls 425 are for inputting the name of database in the remote region 102 "US-EAST" that contains the shared database table "USEAST1_SALESTB". Control 430 are for inputting the identifier of the customer account that owns the shared table "USEAST_SALESTB." In some instances, the text box 430 is auto populated with the owning customer account identifier based on the input to controls 425. Selecting the "create" button 435 will initiate the process of creating the cross-regional resource link 120. There is also a "cancel" button to disregard or back out of creating the cross-regional resource link 120.

FIG. 5 illustrates an example method 500 for cross-regional resource links in federated data lake system 100. The operations are performed by the data warehouse system 108 in a "local" region 102.

In the method 500, the process begins when a local client 106 in the local region 102 submits a query language statement to the local server 122 of the local data warehouse system 108 located in the local region 102 of the multi-tenant provider network. This submission occurs over a network, such as the internet or an internal company or provider network, using established data communication protocols. The local client 106, which could be a user working with a data analysis tool, a business intelligence application, a custom-built software, or a provider network service, constructs a query in a specific query language (SQL or like SQL) designed to retrieve or manipulate data stored in the data warehouse. This query is then sent to the local server 122 through a client-server interaction model. Upon receiving 505 the query, the local server 122, which acts as the access point to the local data warehouse system 108, processes the request.

Once the local server 122 of the local data warehouse system 108 receives 505 the query language statement from the local client 106, the next step is performed by the local driver 124 of the local data warehouse system 108. The local driver 124's role involves interpreting and processing the query. Part of this process is identifying 510 a specific database object-such as a database, a database table, or a view—that is referenced in the query. The query language statement includes references to these database objects, using their names or identifiers, as part of its data retrieval or manipulation instructions.

When the local driver 124 processes the query, it parses and analyzes the statement to extract meaningful information. This includes discerning which database objects the query is targeting. The local 124 driver examines the syntax of the query, identifies the relevant portions that mention the database objects, and understands the context in which these objects are being used. For instance, in a SQL-based query, this might involve parsing the 'FROM' clause to identify a table name, or the 'JOIN' clause to identify multiple tables that the query is intended to interact with. The local driver 124's ability to identify 510 the database objects referenced in the query determines how the rest of the query processing, including data lake metadata 118 retrieval and execution planning, will proceed.

After the local driver 124 of the local data warehouse system identifies 510 the database object referenced in the client 106's query, it proceeds to obtain 515 the necessary data lake metadata 118 about this object. This is a step in query processing, as data lake metadata 118 provides useful information about the structure, format, and location of the data lake data 116 in the data lake. The local driver 124 accesses the local data lake metastore 114, which is a repository containing detailed data lake metadata 118 for data lake data 116 managed within the data warehouse system (e.g., all data lake data 116 in the local region.)

The process involves the local driver 124 querying the local data lake metastore 114 with the name or identifier of the database object (such as a table or a database) referenced in the query. The local data lake metastore 114, upon receiving this request, retrieves the corresponding local data lake metadata 114 entries. These local entries may contain various details about the database object, like its schema (column names and data types), location information (such as file paths in the data lake), partitioning details if applicable, and other relevant attributes. These local entries may also contain one or more cross-regional resource links 120 for the database object.

The local driver 124's task after obtaining 515 the initial data lake metadata 118 for the database object from the local data lake metastore 114 is to analyze this data lake metadata 118 and determine 520 its nature and implications for the query execution. Specifically, the local driver 124 examines the metadata to identify whether it includes a cross-regional resource link 120. Such a cross-regional resource link 120 is an indicator that some or all of the required data lake metadata 118 for the database object, or additional metadata necessary for the query, resides in a different geographical region 102 than the one where the query was initially submitted.

When the local driver 124 accesses the first set of data lake metadata 118 from the local metastore 114, it looks for specific attributes or indicators within this data lake metadata 118 that point to external resources. These indicators are typically in the form of URIs (Uniform Resource Identifiers) or other identifiable markers that signify a reference to a remote location. The presence of a cross-regional resource link 120 in the local data lake metadata 118 suggests that the data warehouse system 108 is federated and distributed, with data lake data 116 and data lake metadata 118 assets spread across multiple regions 102.

Upon identifying 520 such a cross-regional resource link 120 in the local data lake metadata 118 for the database object, the local driver 124 understands that the complete set of information needed to process the query is not entirely local and that it must reach out to another region 102's data lake metastore 114 to fetch additional or pertinent data lake metadata 118. This step is useful in the federated data lake system 100, as it enables the seamless integration and utilization of data resources distributed across different regions 102. The local driver 124's ability to detect and act upon these cross-regional resource links 120 is useful to ensuring efficient and accurate query processing in a distributed and multi-regional data lake environment.

After the local driver 124 of the local data warehouse system 108 identifies the cross-regional resource link 120 within the first set of metadata obtained from the local data lake metastore 114, it proceeds to use this cross-regional resource link 120 to access 525 additional data lake metadata 118 from the remote data lake metastore 114. This cross-regional resource link 120 acts as a pointer or reference to data lake metadata 118 that is stored in a different geographic region 102 within the multi-tenant provider network.

The local driver 124 utilizes the information contained in the cross-regional resource link 120—such as the location (URI or address) of the remote data lake metastore 114, and possibly required authentication credentials—to establish a connection with the remote data lake metastore 114 in the remote region 102. Once this connection is successfully established, the local driver 124 requests the data lake metadata 118 for the specific database object referenced in the original query. This data lake metadata 118 could include detailed information about the database object's structure, schema, physical data location, and other pertinent characteristics that are useful for processing the query.

The remote data lake metastore 114, upon receiving the request, provides the requested data lake metadata 118 back to the local driver 124. This data lake metadata 118 from the remote region 102 is useful because it may contain additional or different information necessary for the accurate execution of the query, especially in a federated environment where data lake data 116 and data lake metadata 118 are distributed across multiple regions 102. The local driver 124's capability to resolve and utilize cross-regional resource links 120 is a useful aspect of efficiently processing queries in the distributed and federated data lake system 100, ensuring that data queries can be accurately and effectively executed regardless of the physical location of the data lake data 116 or its data lake metadata 118.

Once the local driver 124 in the local data warehouse system 108 has successfully obtained the necessary data lake metadata 118, cither from the local data lake metastore 114 or via a cross-regional resource link 120 from a remote data lake metastore 114, the next step is to generate 530 a query execution plan. This plan is based on the comprehensive data lake metadata 118 that the local driver 124 has gathered, which includes detailed information about the structure, format, and location of the data lake data 116 in the data lake.

The process of generating 520 a query execution plan involves the local driver 124 analyzing the data lake metadata 118 to determine the most efficient way to access and process the data lake data 116 as per the query's requirements. The data lake metadata 118 informs the local driver 124 about aspects like which tables and columns are involved, how the data lake data 116 is partitioned, where it is physically stored, and any specific data formats or schemas that need to be considered. Based on this understanding, the local driver 124 formulates a strategy that outlines how to execute the query. This strategy might involve breaking down the query into multiple stages or operations, deciding the order in which these operations should be executed, and determining how to distribute the processing load across the available compute resources.

For instance, if the query involves joining data from different tables or filtering large datasets, the execution plan will include steps to efficiently carry out these operations, potentially leveraging specific features of the underlying data processing framework (like MapReduce, Tez, or Spark). The goal is to create a plan that minimizes data movement and processing time while maximizing resource utilization.

The query execution plan is a roadmap for how the query will be physically executed by the distributed data processing system 110 and possibly across different regions 102 depending on where the data lake data 116 is located. The local driver 124's ability to generate 530 an effective execution plan is useful for the performance and efficiency of the query processing, particularly in complex, distributed environments as described in the scenario.

After the local driver 124 of the local data warehouse system 108 generates 530 a query execution plan based on the obtained 525 data lake metadata 118, it proceeds to execute 535 the query by interfacing with the distributed data processing system 110. The local driver 124 uses the execution plan as a blueprint to orchestrate the processing of the data lake data 116, which is stored in the distributed data storage system 112.

The execution plan details how the query will be broken down into discrete tasks or operations. These tasks are designed to be executed in a distributed manner, coinciding with the architecture of the underlying data storage system 112, which is typically spread across multiple nodes or servers for scalability and fault tolerance. The local driver 124 then translates the execution plan into one or more data processing jobs compatible with the distributed processing framework being used, such as MapReduce, Tez, or Spark.

Each of these jobs is configured to perform specific operations on the data lake data 116—like filtering, aggregation, joining, or sorting—as dictated by the query. The local driver 124 submits these jobs to the distributed data processing system 110, which then schedules and executes them across its compute resources. The distributed data processing system 110 handles the task of distributing the workload, managing resource allocation, and ensuring efficient processing. This might involve moving data across nodes, parallel processing, and consolidating results from different nodes.

Upon completion of these jobs, the processed data lake data 116—which now reflects the output of the query—is collected and made available for the next steps, such as further processing, storage, or direct return to the local client 106. This ability of the local driver 124 to translate a query execution plan into actual distributed data processing jobs and manage their execution in a distributed environment is useful for leveraging the full capabilities of a data lake, ensuring that large and complex data queries can be handled efficiently and effectively.

Once the distributed data processing jobs, as orchestrated by the local driver 124 based on the query execution plan, have been successfully executed 535, the final step is to return 540 the results, or the data response, to the local client 106. This response is the outcome of the query processing, representing the processed and retrieved data from the data lake that meets the criteria specified in the local client 106's query.

After the completion of the distributed data processing jobs, the results are typically collected and consolidated by the distributed data processing system 110. This consolidation is necessary because the processed data lake data 116 might be distributed across various nodes or partitions in the distributed data storage system 112. The local driver 124 then retrieves these results, which may involve aggregating data from multiple sources or nodes, formatting the results as per the requirements of the query, and possibly performing any final transformations or calculations.

Once the data response is ready and in the proper format, the local server 122 of the local data warehouse system 108 sends it back to the local client 106. This transmission is carried out over the network that connects the local client 106 and the local data warehouse system 108. The local client 106, upon receiving the data response, can then use, display, or further process the data as required. This return of data to the local client 106 marks the completion of the query processing cycle.

In an embodiment, an alternative approach to handling remote data lake metadata 118 involves pre-fetching this information from the remote data lake metastore 114, rather than obtaining it on-demand when a query language statement is received. This means that before the client submits a query, the local data warehouse system 108 proactively retrieves remote data lake metadata 114 about database objects that may be referenced in future queries from the remote data lake metastore 114 across the intermediate network 104. This pre-fetched metadata is then temporarily stored (cached) in the local data lake metastore 114 of the data warehouse system 108. By having remote data lake metadata 118 readily available at the local metastore 114, the local data warehouse system 108 can significantly reduce the latency associated with querying and accessing data across regions 102.

When a query language statement is received, the local driver 124 no longer needs to reach out to the remote metastore 114 to obtain necessary metadata 118. Instead, it can directly access this information from the local metastore 114, streamlining the process of generating a query execution plan and executing distributed data processing jobs. This preemptive strategy enhances the efficiency of data querying and processing within the federated data lake system 100, offering faster response times to client queries by minimizing delays caused by cross-regional data access.

In an embodiment, the determination of which remote metadata 118 to pre-fetch from the remote data lake metastore 114 can be enhanced by analyzing historical query patterns. By examining the history of queries submitted by clients, the data warehouse system 108 can identify patterns and trends regarding which database objects and therefore which metadata are most frequently accessed. This analysis can employ machine learning algorithms to predict future query behavior based on past trends. For example, a machine learning model could analyze the frequency, timing, and nature of past queries to forecast which database objects are likely to be requested by clients 106 in the near future. Based on these predictions, the data warehouse system 108 can proactively retrieve metadata 118 for these objects from the remote metastores 114 before the queries are actually submitted. This predictive pre-fetching approach allows the local data lake metastore 114 to have relevant remote data lake metadata 118 readily and locally available, thereby reducing query processing times and improving the local data warehouse system 108's overall efficiency. Such a strategy leverages the power of machine learning to anticipate client needs and optimize data access across the federated data lake system 100, ensuring that the system 100 is not only reactive but also proactive in managing data resources efficiently across regions 102.

In an embodiment, cross-regional resource links serve as a useful mechanism for navigating and accessing metadata across disparate regions within the federated data lake system 100. When searching the metastore for metadata, these links enable the data warehouse system 108 to extend its reach beyond the local data store to encompass metadata stored in remote regions. Essentially, when a query or a metadata request is initiated and the local metastore is searched, the data warehouse system 108 may encounter a cross-regional resource link. This link is a reference that points to a specific location in a remote metastore, indicating that relevant or supplementary metadata about a database object is stored in a data lake outside the local region.

Upon discovering a cross-regional resource link during the local metastore search, the data warehouse system 108 can then follow this link to query the remote metastore directly. This process involves initiating a request to the remote region's metastore, using the details provided by the cross-regional link, such as the remote region's identifier, the specific database or table name, and potentially other identifying information necessary to access the remote metadata. The system thus effectively traverses geographical and network boundaries to retrieve metadata from wherever it resides within the federated system 100.

This capability to use cross-regional resource links for discovering and accessing remote metadata enables a unified and comprehensive view of the data assets spread across the entire federated data lake system 100. It ensures that data analysts and applications can obtain the most relevant and complete metadata information, irrespective of where the data or its descriptive metadata is physically stored. This approach not only facilitates efficient data management and integration across regions but also supports advanced data analysis and processing workflows by ensuring that all pertinent metadata is accessible when and where it is needed.

Figure 6:
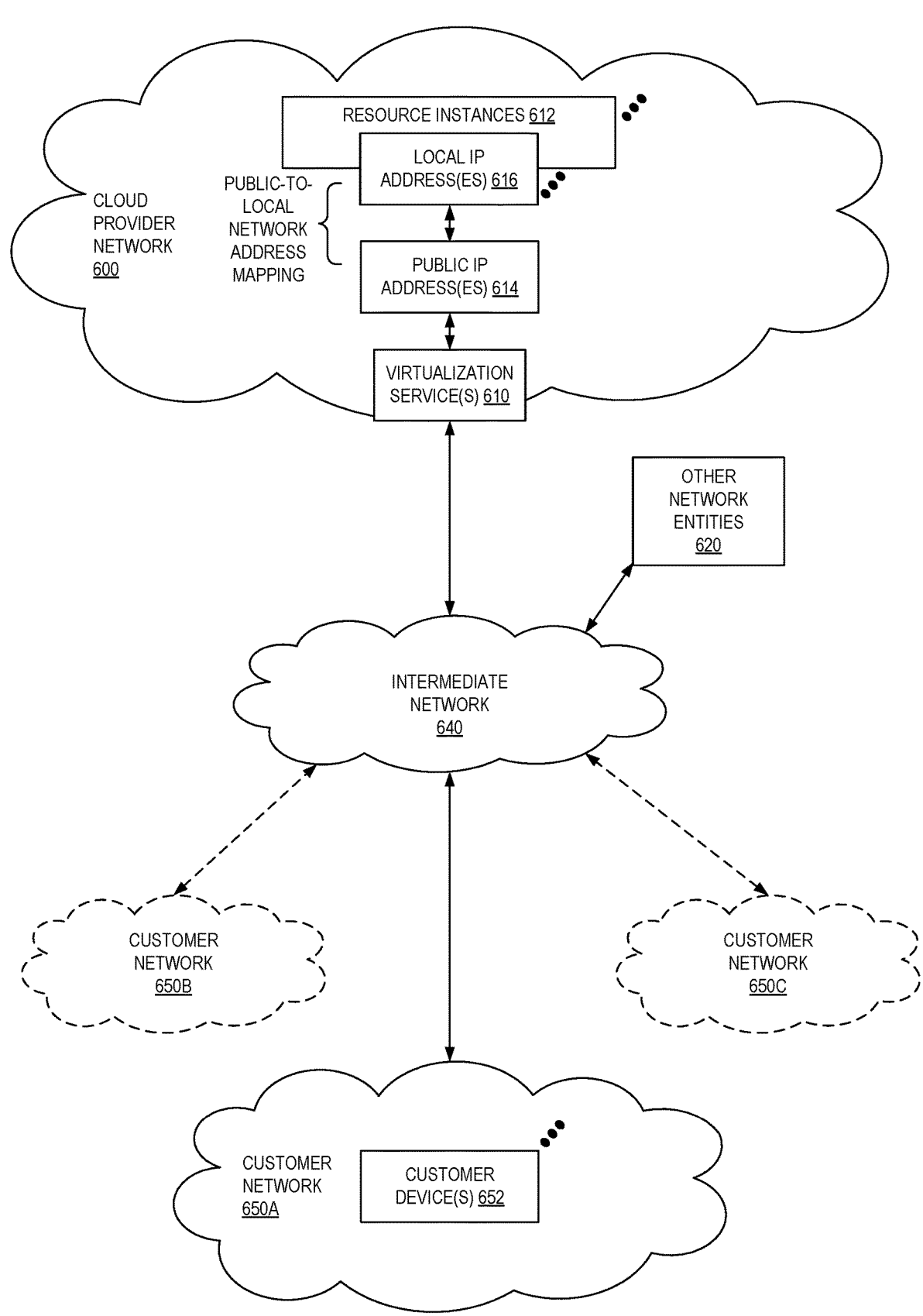
FIG. 6 illustrates an example multi-tenant provider network environment in which the techniques disclosed herein for cross-regional resource links in a federated data lake management and integration system are implemented.

FIG. 6 illustrates an example multi-tenant provider network environment in which the techniques disclosed herein for cross-regional resource links in a federated data lake management and integration system are implemented. A provider network 600 provides resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 is associated with the resource instances 612; the local IP addresses are the internal network addresses of the resource instances 612 on the provider network 600. In some examples, the provider network 600 provides public IP addresses 614 and/or public IP address ranges (e.g., Internet Protocol version 4 (IPv4) or Internet Protocol version 6 (IPv6) addresses) that customers obtain from the provider network 600.

The provider network 600, via the virtualization services 610, allows a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 also allows the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C implement customer-specific applications and present the customer's applications on an intermediate network 640, such as the Internet. Other network entities 620 on the intermediate network 640 then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 is routed via the network substrate back onto the intermediate network 640 to the source entity 620.

Local IP addresses, as used herein, refer to the internal or "private" network addresses, for example, of resource instances in a provider network. Local IP addresses are within address blocks reserved by Internet Engineering Task Force (IETF) Request for Comments (RFC) 1918 and/or of an address format specified by IETF RFC 4193 and is mutable within the provider network. Network traffic originating outside the provider network is not directly routed to local IP addresses; instead, the traffic uses public IP addresses that are mapped to the local IP addresses of the resource instances. The provider network includes networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via a 1:1 NAT, and forwarded to the respective local IP address of a resource instance.

Some public IP addresses are assigned by the provider network infrastructure to particular resource instances; these public IP addresses are referred to as standard public IP addresses, or simply standard IP addresses. In some examples, the mapping of a standard IP address to a local IP address of a resource instance is the default launch configuration for all resource instance types.

At least some public IP addresses are allocated to or obtained by customers of the provider network 600; a customer then assigns their allocated public IP addresses to particular resource instances allocated to the customer. These public IP addresses are referred to as customer public IP addresses, or simply customer IP addresses. Instead of being assigned by the provider network 600 to resource instances as in the case of standard IP addresses, customer IP addresses are assigned to resource instances by the customers, for example via an API provided by the service provider. Unlike standard IP addresses, customer IP addresses are allocated to customer accounts and are remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
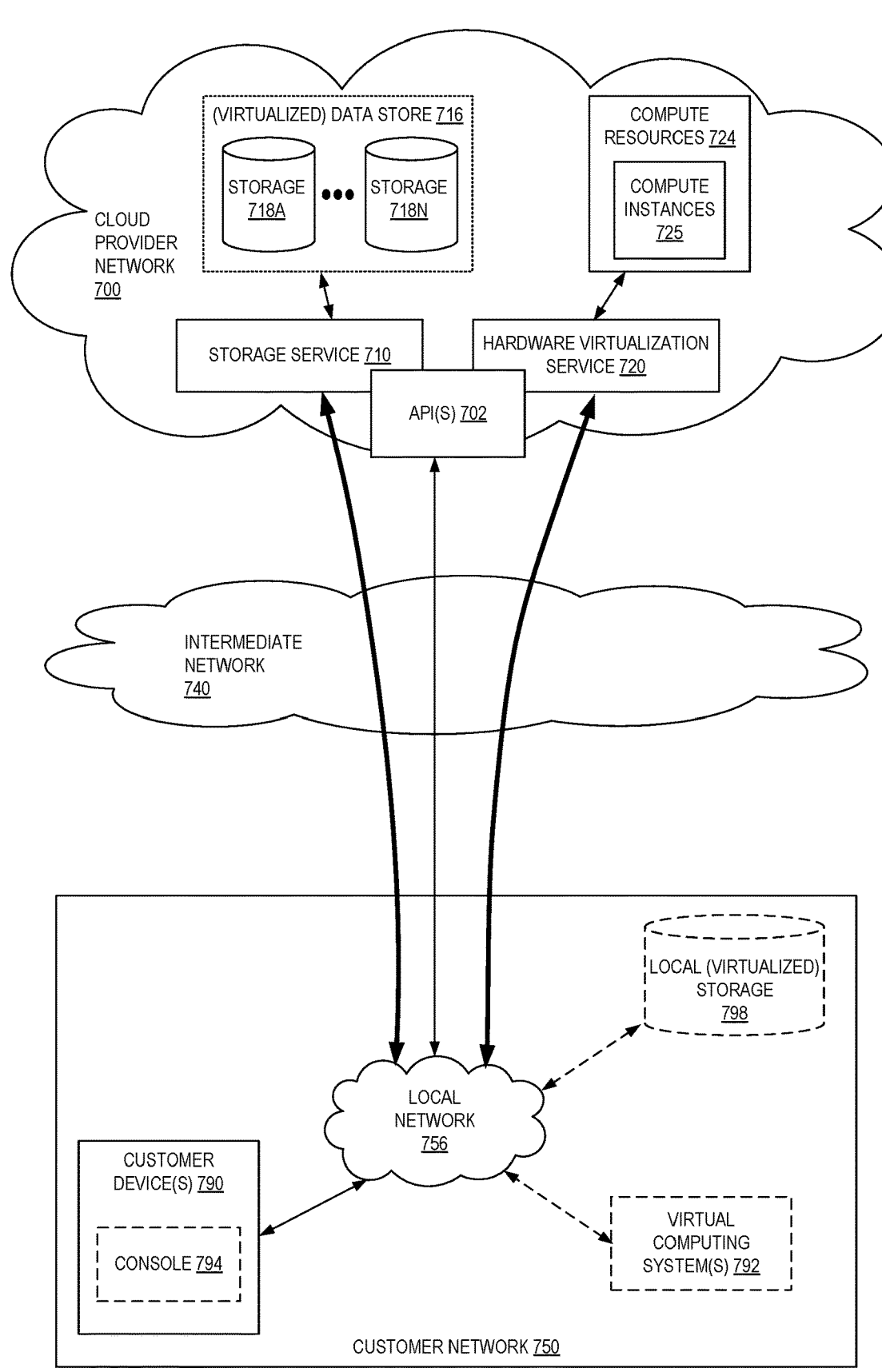
FIG. 7 is a block diagram of an example multi-tenant provider network that provides a storage service and a hardware virtualization service to customers and in which the techniques disclosed herein for cross-regional resource links in a federated data lake management and integration system are implemented.

FIG. 7 is a block diagram of an example multi-tenant provider network that provides a storage service and a hardware virtualization service to customers and in which the techniques disclosed herein for cross-regional resource links in a federated data lake management and integration system are implemented. A hardware virtualization service 720 provides multiple compute resources 724 (e.g., compute instances 725, such as VMs) to customers. The compute resources 724 are provided as a service to customers of a provider network 700 (e.g., to a customer that implements a customer network 750). Each computation resource 724 is provided with one or more local IP addresses. The provider network 700 is configured to route packets from the local IP addresses of the compute resources 724 to public Internet destinations, and from public Internet sources to the local IP addresses of the compute resources 724.

The provider network 700 provides the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 provides one or more APIs 702, for example a web services interface, via which the customer network 750 accesses functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 corresponds to a computation resource 724 that is leased, rented, or otherwise provided to the customer network 750.

From an instance of the virtual computing system(s) 792 and/or another customer device 790 (e.g., via console 794), the customer accesses the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) is provided at the customer network 750 that locally caches at least some data, for example frequently accessed or critical data, and that communicates with the storage service 710 via one or more communications channels to upload new or modified data from a local cache so that the primary store of data (the virtualized data store 716) is maintained. In some examples, a user, via the virtual computing system 792 and/or another customer device 790, mounts and accesses virtual data store 716 volumes via the storage service 710 acting as a storage virtualization service, and these volumes appear to the user as local (virtualized) storage 798.

While not shown in FIG. 7, the virtualization service(s) are accessed from resource instances within the provider network 700 via the API(s) 702. For example, a customer, appliance service provider, or other entity accesses a virtualization service from within a respective virtual network on the provider network 700 via the API(s) 702 to request allocation of one or more resource instances within the virtual network or within another virtual network.

Figure 8:
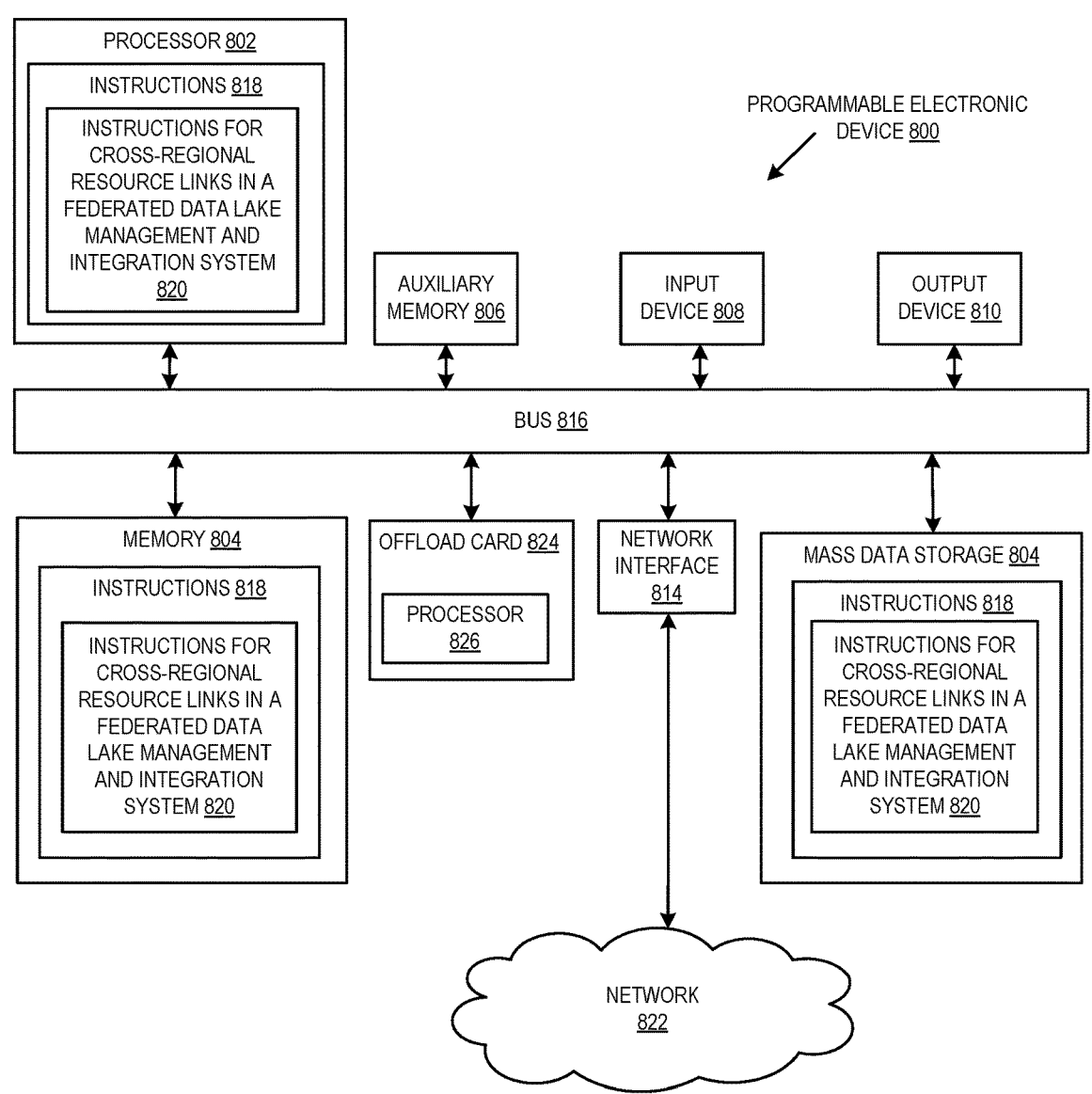
FIG. 8 illustrates an example of a programmable electronic device that processes and manipulates data to perform methods, processes, operations, tasks, and calculations disclosed herein for cross-regional resource links in a federated data lake management and integration system.

FIG. 8 illustrates an example of a programmable electronic device that processes and manipulates data to perform tasks and calculations disclosed herein for cross-regional resource links in a federated data lake management and integration system. Example programmable electronic device 800 includes electronic components encompassing hardware or hardware and software including processor 802, memory 804, auxiliary memory 806, input device 808, output device 810, mass data storage 812, network interface 814, and offload card 824, all connected to bus 816.

While only one of each type of component is depicted in FIG. 8 for the purpose of providing a clear example, multiple instances of any or all these electronic components are present in device 800 in other instances. For example, multiple processors are connected to bus 816 in a particular implementation of device 800. Accordingly, unless the context clearly indicates otherwise, reference with respect to FIG. 8 to a component of device 800 in the singular such as, for example, processor 802, is not intended to exclude the plural where, in a particular instance of device 800, multiple instances of the electronic component are present. Further, some electronic components might not be present in a particular instance of device 800. For example, device 800 in a headless configuration such as, for example, when operating as a server racked in a data center, might not include, or be connected to, input device 808 or output device 810. As another example, offload card 824 might be absent from device 800 when not operating as a server racked in a data center as part of a cloud-based hosted compute service.

Processor 802 is an electronic component that processes (e.g., executes, interprets, or otherwise processes) instructions 818 including instructions 820 for cross-regional resource links in a federated data lake management and integration system. In some instances, processor 802 fetches, decodes, and executes instructions 818 from memory 804 and performs arithmetic and logic operations dictated by instructions 818 and coordinates the activities of other electronic components of device 800 in accordance with instructions 818. In some instances, processor 802 is made using silicon wafers according to a manufacturing process (e.g., 7 nm, 5 nm, or 3 nm). In some instances, processor 802 is configured to understand and execute a set of commands referred to as an instruction set architecture (ISA) (e.g., x86, x86_64, or ARM).

In some instances, processor 802 includes a cache used to store frequently accessed instructions 818 to speed up processing. In some instances, processor 802 has multiple layers of cache (L1, L2, L3) with varying speeds and sizes.

In some instances, processor 802 is composed of multiple cores where each such core is a processor within processor 802. The cores allow processor 802 to process multiple instructions 818 at once in a parallel processing manner.

In some instances, processor 802 supports multi-threading where each core of processor 802 handles multiple threads (multiple sequences of instructions) at once to further enhance parallel processing capabilities.

In some instances, processor 802 is any of the following types of central processing units (CPUs): a desktop processor for general computing, gaming, content creation, etc.; a server processor for data centers, enterprise-level applications, cloud services, etc.; a mobile processor for portable computing devices like laptops and tablets for enhanced battery life and thermal management; a workstation processor for intense computational tasks like 3D rendering and simulations; or any other type of CPU suitable for the particular implementation at hand.

While processor 802 might be a CPU, processor 802, in some instances, is any of the following types of processors: a graphics processing unit (GPU) capable of highly parallel computation allowing for processing of multiple calculations simultaneously and useful for rendering images and videos and for accelerating machine learning computation tasks; a digital signal processor (DSP) designed to process analog signals like audio and video signals into digital form and vice versa, commonly used in audio processing, telecommunications, and digital imaging; specialized hardware for machine learning workloads, especially those involving tensors (multi-dimensional arrays); a field-programmable gate array (FPGA) or other reconfigurable integrated circuit that is customized post-manufacturing for specific applications, such as cryptography, data analytics, and network processing; a neural processing unit (NPU) or other dedicated hardware designed to accelerate neural network and machine learning computations, commonly found in mobile devices and edge computing applications; an image signal processor (ISP) specialized in processing images and videos captured by cameras, adjusting parameters like exposure, white balance, and focus for enhanced image quality; an accelerated processing unit (APU) combing a CPU and a GPU on a single chip to enhance performance and efficiency, especially in consumer electronics like laptops and consoles; a vision processing unit (VPU) dedicated to accelerating machine vision tasks such as image recognition and video processing, typically used in drones, cameras, and autonomous vehicles; a microcontroller unit (MCU) or other integrated processor designed to control electronic devices, containing CPU, memory, and input/output peripherals; an embedded processor for integration into other electronic devices such as washing machines, cars, industrial machines, etc.; a system on a chip (SoC) such as those commonly used in smartphones encompassing a CPU integrated with other components like a graphics processing unit (GPU) and memory on a single chip; or any other type of processor suitable for the particular implementation at hand.

Memory 804 is an electronic component that stores data and instructions 818 that processor 802 processes. In some instances, memory 804 provides the space for the operating system, applications, and data in current use to be quickly reached by processor 802. In some instances, memory 804 is a random-access memory (RAM) that allows data items to be read or written in substantially the same amount of time irrespective of the physical location of the data items inside memory 804.

In some instances, memory 804 is a volatile or non-volatile memory. Data stored in a volatile memory is lost when the power is turned off. Data in non-volatile memory remains intact even when the system is turned off. In some instances, memory 804 is Dynamic RAM (DRAM). DRAM such as Single Data Rate RAM (SDRAM) or Double Data Rate RAM (DDRAM) is volatile memory that stores each bit of data in a separate capacitor within an integrated circuit. The capacitors of DRAM leak charge and need to be periodically refreshed to avoid information loss. In some instances, memory 804 is Static RAM (SRAM). SRAM is volatile memory that is typically faster but more expensive than DRAM. SRAM uses multiple transistors for each memory cell but does not need to be periodically refreshed. Additionally, or alternatively, SRAM is used for cache memory in processor 802 in some instances. In some instances, memory 804 encompasses both DRAM and SRAM.

Device 800 has auxiliary memory 806 other than memory 804. Examples of auxiliary memory 806 include cache memory, register memory, read-only memory (ROM), secondary storage, virtual memory, memory controller, and graphics memory. In some instances, device 800 has multiple auxiliary memories including different types of auxiliary memories.

Cache memory is found inside or very close to processor 802 and is typically faster but smaller than memory 804. Cache memory is used to hold frequently accessed instructions 818 (encompassing any associated data) to speed up processing. In some instances, cache memory is hierarchical ranging from Level 1 cache memory which is the smallest but fastest cache memory and is typically inside processor 802 to Level 2 and Level 3 cache memory which are progressively larger and slower cache memories that are inside or outside processor 802.

Register memory is a small but very fast storage location within processor 802 designed to hold data temporarily for ongoing operations.

ROM is a non-volatile memory device that is only read, not written to. In some instances, ROM is a Programmable ROM (PROM), Erasable PROM (EPROM), or electrically erasable PROM (EEPROM). In some instances, ROM stores basic input/output system (BIOS) instructions which help device 800 boot up.

Secondary storage is a non-volatile memory. In some instances, secondary storage encompasses any or all of: a hard disk drive (HDD) or other magnetic disk drive device; a solid-state drive (SSD) or other NAND-based flash memory device; an optical drive like a CD-ROM drive, a DVD drive, or a Blu-ray drive; or flash memory device such as a USB drive, an SD card, or other flash storage device.

Virtual memory is a portion of a hard drive or an SSD that the operating system uses as if it were memory 804. When memory 804 gets filled, less frequently accessed data and instructions 818 is "swapped" out to the virtual memory. The virtual memory is slower than memory 804, but it provides the illusion of having a larger memory 804.

A memory controller manages the flow of data and instructions 818 to and from memory 804. The memory controller is located either on the motherboard of device 800 or within processor 802.

Graphics memory is used by a graphics processing unit (GPU) and is specially designed to handle the rendering of images, videos, graphics, or performing machine learning calculations. Examples of graphics memory include graphics double data rate (GDDR) such as GDDR5 and GDDR6.

Input device 808 is an electronic component that allows users to feed data and control signals into device 800. Input device 808 translates a user's action or the data from the external world into a form that device 800 processes. Examples of input device 808 include a keyboard, a pointing device (e.g., a mouse), a touchpad, a touchscreen, a microphone, a scanner, a webcam, a joystick/game controller, a graphics tablet, a digital camera, a barcode reader, a biometric device, a sensor, and a MIDI instrument.

Output device 810 is an electronic component that conveys information from device 800 to the user or to another device. The information is in the form of text, graphics, audio, video, or other media representation. Examples of output device 810 include a monitor or display device, a printer device, a speaker device, a headphone device, a projector device, a plotter device, a braille display device, a haptic device, a LED or LCD panel device, a sound card, and a graphics or video card.

Mass data storage 812 is an electronic component used to store data and instructions 818. In some instances, mass data storage 812 is non-volatile memory. Examples of mass data storage 812 include a hard disk drive (HDD), a solid-state drive (SDD), an optical drive, a flash memory device, a magnetic tape drive, a floppy disk, an external drive, or a RAID array device.

In sone instances, mass data storage 812 is additionally or alternatively connected to device 800 via network 822. In some instances, mass data storage 812 encompasses a network attached storage (NAS) device, a storage area network (SAN) device, a cloud storage device, or a centralized network filesystem device.

Network interface 814 (sometimes referred to as a network interface card, NIC, network adapter, or network interface controller) is an electronic component that connects device 800 to network 822. Network interface 814 functions to facilitate communication between device 800 and network 822. Examples of a network interface 814 include an ethernet adaptor, a wireless network adaptor, a fiber optic adapter, a token ring adaptor, a USB network adaptor, a Bluetooth adaptor, a modem, a cellular modem or adapter, a powerline adaptor, a coaxial network adaptor, an infrared (IR) adapter, an ISDN adaptor, a VPN adaptor, and a TAP/TUN adaptor.

Bus 816 is an electronic component that transfers data between other electronic components of or connected to device 800. Bus 816 serves as a shared highway of communication for data and instructions (e.g., instructions 818), providing a pathway for the exchange of information between components within device 800 or between device 800 and another device. Bus 816 connects the different parts of device 800 to each other. In some instances, bus 816 encompasses one or more of: a system bus, a front-side bus, a data bus, an address bus, a control bus, an expansion bus, a universal serial bus (USB), a I/O bus, a memory bus, an internal bus, an external bus, and a network bus.

Instructions 818 are computer-processable instructions that take different forms. In some instances, instructions 818 are in a low-level form such as binary instructions, assembly language, or machine code according to an instruction set (e.g., x86, ARM, MIPS) that processor 802 is designed to process. In some instances, instructions 818 include individual operations that processor 802 is designed to perform such as arithmetic operations (e.g., add, subtract, multiply, divide, etc.); logical operations (e.g., AND, OR, NOT, XOR, etc.); data transfer operations including moving data from one location to another such as from memory 804 into a register of processor 802 or from a register to memory 804; control instructions such as jumps, branches, calls, and returns; comparison operations; and specialization operations such as handling interrupts, floating-point arithmetic, and vector and matrix operations. In some instances, instructions 818 are in a higher-level form such as programming language instructions in a high-level programming language such as Python, Java, C++, etc. In some instances, instructions 818 are in an intermediate level form in between a higher-level form and a low-level form such as bytecode or an abstract syntax tree (AST).

Instructions 818 for processing by processor 802 are in different forms at the same or different times. In some instances, when stored in mass data storage 812 or memory 804, instructions 818 are stored in a higher-level form such as Python, Java, or other high-level programing language instructions, in an intermediate-level form such as Python or Java bytecode that is compiled from the programming language instructions, or in a low-level form such as binary code or machine code. In some instances, when stored in processor 802, instructions 818 are stored in a low-level form such as binary instructions, assembly language, or machine code according to an instruction set architecture (ISA). In some instances, instructions 818 are stored in processor 802 in an intermediate level form or even a high-level form where CPU 802 processes instructions in such form.

Instructions 818 are processed by one or more processors of device 800 using a processing model such as any or all of the following processing models: sequential execution where instructions are processed one after another in a sequential manner; pipelining where pipelines are used to process multiple instruction phases concurrently; multiprocessing where different processors different instructions concurrently, sharing the workload; thread-level parallelism where multiple threads run in parallel across different processors; simultaneous multithreading or hyperthreading where a single processor processes multiple threads simultaneously, making it appear as multiple logical processors; multiple instruction issue where multiple instruction pipelines allow for the processing of several instructions during a single clock cycle; parallel data operations where a single instruction is used to perform operations on multiple data elements concurrently; clustered or distributed computing where multiple processors in a network (e.g., in the cloud) collaboratively process the instructions, distributing the workload across the network; graphics processing unit (GPU) acceleration where GPUs with their many processors allow the processing of numerous threads in parallel, suitable for tasks like graphics rendering and machine learning; asynchronous execution where processing of instructions is driven by events or interrupts, allowing the one or more processors to handle tasks asynchronously; concurrent instruction phases where multiple instruction phases (e.g., fetch, decode, execute) of different instructions are handled concurrently; parallel task processing where different processors handle different tasks or different parts of data, allowing for concurrent processing and execution; or any other processing model suitable to meet the requirements of the particular implementation at hand.

Network 822 is a collection of interconnected computers, servers, and other programmable electronic devices that allow for the sharing of resources and information. Network 822 ranges in size from just two connected devices to a global network (e.g., the internet) with many interconnected devices. In some instances, network 822 encompasses network devices such as routers, switches, hubs, modems, and access points.

Individual devices on network 822 are sometimes referred to as "network nodes." Network nodes communicate with each other through mediums or channels sometimes referred to as "network communication links." The network communication links are wired (e.g., twisted-pair cables, coaxial cables, or fiber-optic cables) or wireless (e.g., Wi-Fi, radio waves, or satellite links). Network nodes follow a set of rules sometimes referred to "network protocols" that define how the network nodes communicate with each other. Example network protocols include data link layer protocols such as Ethernet and Wi-Fi, network layer protocols such as IP (Internet Protocol), transport layer protocols such as TCP (Transmission Control Protocol), application layer protocols such as HTTP (Hypertext transfer Protocol) and HTTPS (HTTP Secure), and routing protocols such as OSPF (Open Shortest Path First) and BGP (Border Gateway Protocol).

Network 822 has a particular physical or logical layout or arrangement sometimes referred to as a "network topology." Example network topologies include bus, star, ring, and mesh. In some instances, network 822 encompasses any or all of the following categories of networks: a personal area network (PAN) that covers a small area (a few meters), like a connection between a computer and a peripheral device via Bluetooth; a local area network (LAN) that covers a limited area, such as a home, office, or campus; a metropolitan area network (MAN) that covers a larger geographical area, like a city or a large campus; a wide area network (WAN) that spans large distances, often covering regions, countries, or even globally (e.g., the internet); a virtual private network (VPN) that provides a secure, encrypted network that allows remote devices to connect to a LAN over a WAN; an enterprise private network (EPN) build for an enterprise, connecting multiple branches or locations of a company; or a storage area network (SAN) that provides specialized, high-speed block-level network access to storage using high-speed network links like Fibre Channel.

Device 800 includes offload card 824. Offload card 824 includes its own processor 826. Although not depicted in FIG. 1, offload card 824 in some instances also includes network interface 814. Offload card 824 is connected to bus 816 via a Peripheral Component Interconnect-Express (PCI-E) standard or another suitable interconnect standard such as, for example, a QuickPath interconnect (QPI) standard or an UltraPath interconnect (UPI) standard.

In some instances, device 800 includes offload card 824 when device 800 acts as a host electronic device such as, for example, when operating as part of a hosted compute service. In this case, device 800 hosts compute instances such as, for example, virtual machine instances or application container instances and offload card 824 and processor 826 run a hosted compute manager application that manages the hosted compute instances that run on device 800 and processor 802. In some instances, the hosted compute manager application performs hosted compute instance management operations, such as pausing or un-pausing hosted compute instances, launching or terminating hosted compute instances, performing memory transfer/copying operations, or other suitable hosted compute instance management operations. These management operations, in some instances, are performed by the hosted compute manager application in coordination with a hypervisor (e.g., upon a request from the hypervisor) that runs on device 800 and processor 802. However, in some instances, the hosted compute manager application is configured to process requests from other entities (e.g., from the hosted compute instances themselves), and does not coordinate with a hypervisor on device 800.

Terminology

As used herein and in the appended claims, the term "computer-readable media" refers to one or more mediums or devices that store or transmit information in a format that a computer system accesses. Computer-readable media encompasses both storage media and transmission media. Storage media includes volatile and non-volatile memory devices such as RAM devices, ROM devices, secondary storage devices, register memory devices, memory controller devices, graphics memory devices, and the like. Transmission media includes wired and wireless physical pathways that carry communication signals such as twisted pair cable, coaxial cable, fiber optic cable, radio waves, microwaves, infrared, visible light communication, and the like.

As used herein and in the appended claims, the term "non-transitory computer-readable media" encompasses computer-readable media as just defined but excludes transitory, propagating signals. Data stored on non-transitory computer-readable media isn't just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." The first and second devices are both devices, but not the same device.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, unless otherwise clear in context, phrases such as "a device configured to" are intended to include one or more recited devices. Such one or more recited devices, unless otherwise clear in context, are collectively configured to carry out the stated recitations. For example, "a processor configured to carry out recitations A, B and C" encompasses both (a) a single processor configured to carry out recitations A, B, and C and (b) a first processor configured to carry out recitation A working in conjunction with a second processor configured to carry out recitations B and C.

Unless otherwise clear in context, the terms "set," and "collection" should generally be interpreted to include one or more described items throughout this application. Accordingly, unless otherwise clear in context, phrases such as "a set of devices configured to" or "a collection of devices configured to" are intended to include one or more recited devices. Such one or more recited devices, unless otherwise clear in context, are collectively configured to carry out the stated recitations. For example, "a set of servers configured to carry out recitations A, B and C" encompasses both (a) a single server configured to carry out recitations A, B, and C and (b) a first server configured to carry out recitations A and B working in conjunction with a second server configured to carry out recitation C.

As used herein, unless otherwise clear in context, the term "or" is open-ended and encompasses all possible combinations, except where infeasible. For example, if it is stated that a component includes A or B, then, unless infeasible or otherwise clear in context, the component includes at least A, or at least B, or at least A and B. As a second example, if it is stated that a component includes A, B, or C then, unless infeasible or otherwise clear in context, the component includes at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. is either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical (e.g., a condition precedent) or causal connection or association between two stated things where one of the things is the basis for or informs the other without requiring or foreclosing additional unstated things that affect the logical or casual connection or association between the two stated things.

Unless the context clearly indicates otherwise, the relational term "in response to" or "responsive to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

The specification and drawings are to be regarded in an illustrative sense rather than a restrictive sense. In the foregoing specification, embodiments of the disclosure have been described with reference to specific examples. Various modifications made thereto do not depart from the broader spirit and scope of the embodiments of the disclosure that are set forth in the following claims.

What is claimed is:

1. A method for cross-regional resource links in a federated data lake management and integration system, the method comprising:

receiving a query language statement, from a client, at a server of a data warehouse system in a first region of a plurality of regions of a multi-tenant provider network;

identifying, by a driver of the data warehouse system in the first region, a database object referenced in the query language statement;

obtaining, by the driver of the data warehouse system in the first region, from a local data lake metastore of the data warehouse system in the first region, first data lake metadata about the database object referenced in the query language statement;

determining, by the driver of the data warehouse system in the first region, that the first data lake metadata comprises a cross-regional resource link pointing at a second region of the plurality of regions;

obtaining, by the driver of the data warehouse system in the first region, from a remote data lake metastore in the second region, second data lake metadata about the database object referenced in the query language statement using the cross-regional resource link;

generating, by the driver of the data warehouse system in the first region, a query execution plan based on the second data lake metadata;

causing, by the driver of the data warehouse system in the first region, based on the query execution plan, a distributed data processing system to execute one or more distributed data processing jobs that process data lake data stored by a distributed data storage system; and returning, by the server of the data warehouse system in the first region, to the client, data responsive to the query language statement.

2. The method of claim 1, further comprising:

providing a graphical user interface for creating the cross-regional resource link, the graphical user interface comprising graphical user interface controls for specifying a resource link name, a shared database owner region, a shared database, and a shared database's owner identifier.

3. The method of claim 1, further comprising:

providing a graphical user interface for creating the cross-regional resource link, the graphical user interface comprising graphical user interface controls for specifying a resource link name, a database, a shared table owner region, a shared table, a shared table's database, and a shared table's owner identifier.

4. A method for cross-regional resource links in a federated data lake management and integration system, the method comprising:

receiving a query language statement at a server of a data warehouse system in a first region of a plurality of regions of a multi-tenant provider network;

identifying a database object referenced in the query language statement;

obtaining, from a local data lake metastore in the first region, first data lake metadata about the database object referenced in the query language statement;

in response to determining that the first data lake metadata comprises a cross-regional resource link, obtaining, from a remote data lake metastore, second data lake metadata about the database object referenced in the query language statement using the cross-regional resource link;

generating, by a driver of the data warehouse system in the first region, a query execution plan based on the second data lake metadata;

causing, based on the query execution plan, a distributed data processing system to execute one or more distributed data processing jobs that process data lake data stored by a distributed data storage system; and returning data responsive to the query language statement.

5. The method of claim 4, further comprising:

providing a graphical user interface for creating the cross-regional resource link, the graphical user interface comprising graphical user interface controls for specifying a resource link name, a shared database owner region, a shared database, and a shared database's owner identifier.

6. The method of claim 4, further comprising:

providing a graphical user interface for creating the cross-regional resource link, the graphical user interface comprising graphical user interface controls for specifying a resource link name, a database, a shared table owner region, a shared table, a shared table's database, and a shared table's owner identifier.

7. The method of claim 4, wherein the database object belongs to a first customer account held with the multi-tenant provider network; wherein the cross-regional resource link belongs to a second customer account held with the multi-tenant provider network; and wherein the database object is shared by the first customer account with the second customer account.

8. The method of claim 4, wherein the remote data lake metastore is located in a second region of the multi-tenant provider network.

9. The method of claim 4, wherein the one or more distributed data processing jobs both process data lake data in the first region of the multi-tenant provider network and process data lake data in a second region of the multi-tenant provider network.

10. The method of claim 4, wherein the database object is a database table; and wherein the second data lake metadata obtained from the remote data lake metastore comprises schema information about the database table.

11. The method of claim 4, wherein the database object is a database table partition; and wherein the second data lake metadata obtained from the remote data lake metastore comprises a partition key.

12. The method of claim 4, wherein the database object is a database view; and wherein the second data lake metadata obtained from the remote data lake metastore comprises a query for instantiating the database view.

13. The method of claim 4, wherein the database object is a database, a database table, database table partition, or a database view.

14. The method of claim 4, where the one or more distributed data processing jobs comprise a MapReduce job, a Tez job, or a Spark job.

15. A system for cross-regional resource links in a federated data lake management and integration system, the system comprising:

one or more programmable electronic devices in a first region of a multi-tenant provider network, the one or more programmable electronic devices in the first region to implement a data warehouse system in the first region;

one or more programmable electronic devices in a second region of a multi-tenant provider network, the one or more programmable electronic devices in the second region to implement a data warehouse system in the second region; the data warehouse system in the second region comprising instructions which, when executed, cause the data warehouse system in the second region to:

receive a query language statement;

identify a database object referenced in the query language statement;

obtain, from a local data lake metastore in the second region, first data lake metadata about the database object referenced in the query language statement;

obtain, from a remote data lake metastore in the first region, second data lake metadata about the database object referenced in the query language statement using the cross-regional resource link;

generate a query execution plan based on the second data lake metadata;

cause, based on the query execution plan, a distributed data processing system to execute one or more distributed data processing jobs that process data lake data stored by a distributed data storage system; and return data responsive to the query language statement.

16. The system of claim 15, wherein the data warehouse system in the second region further comprises instructions which, when executed causes the data warehouse system in the second region to:

provide a graphical user interface for creating the cross-regional resource link, the graphical user interface comprising graphical user interface controls for specifying a resource link name, a shared database owner region, a shared database, and a shared database's owner identifier.

17. The system of claim 15, wherein the data warehouse system in the second region further comprises instructions which, when executed causes the data warehouse system in the second region to:

provide a graphical user interface for creating the cross-regional resource link, the graphical user interface comprising graphical user interface controls for specifying a resource link name, a database, a shared table owner region, a shared table, a shared table's database, and a shared table's owner identifier.

18. The system of claim 15, wherein the database object belongs to a first customer account held with the multi-tenant provider network; wherein the cross-regional resource link belongs to a second customer account held with the multi-tenant provider network; and wherein the database object is shared by the first customer account with the second customer account.

19. The system of claim 15, further comprising:

first data lake data stored by the distributed data storage system in the first region;

second data lake data stored by the distributed data storage system in the second region; and wherein the one or more distributed data processing jobs both process, in the first region, the first data lake data and process, in the second region, the second data lake data.

20. The system of claim 15, wherein the database object is a database, a database table, database table partition, or a database view.

\* \* \* \* \*